(12) United States Patent
Viswanatha et al.

(10) Patent No.: US 11,046,452 B1
(45) Date of Patent: Jun. 29, 2021

(54) HEAD-UP DISPLAY INCLUDING SUPPLEMENTAL INDICATOR

(71) Applicant: Rockwell Collins, Inc., Cedar Rapids, IA (US)

(72) Inventors: Raghunath Viswanatha, Lake Oswego, OR (US); Daniel Y. Chiew, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 117 days.

(21) Appl. No.: 15/253,495

(22) Filed: Aug. 31, 2016

(51) Int. Cl.
*B64D 45/00* (2006.01)
*H04N 9/31* (2006.01)
*G06T 11/20* (2006.01)
*G02B 27/01* (2006.01)

(52) U.S. Cl.
CPC ......... *B64D 45/00* (2013.01); *G02B 27/0149* (2013.01); *G06T 11/20* (2013.01); *H04N 9/31* (2013.01)

(58) Field of Classification Search
CPC ...... B64D 45/00; G02B 27/0149; G06T 11/20
USPC .......................................................... 345/8
See application file for complete search history.

(56) References Cited

U.S. PATENT DOCUMENTS

| | | | | |
|---|---|---|---|---|
| 6,552,789 B1* | 4/2003 | Modro | ...................... | G01D 5/32 345/7 |
| 8,560,150 B1* | 10/2013 | Phillips | ................... | B64D 45/08 303/126 |
| 8,937,772 B1* | 1/2015 | Burns | ................ | G02B 27/0172 359/632 |
| 2010/0156673 A1* | 6/2010 | Grothe | ................. | G08G 5/0008 340/961 |
| 2013/0191741 A1* | 7/2013 | Dickinson | ............... | G06F 1/163 715/702 |
| 2015/0379351 A1* | 12/2015 | Dibenedetto | ...... | G06K 9/00671 345/633 |
| 2016/0247406 A1* | 8/2016 | Khatwa | ................. | G05D 1/0676 |
| 2017/0329143 A1* | 11/2017 | Svarichevsky | ........ | B60K 35/00 |
| 2018/0011314 A1* | 1/2018 | Quiroz de la Mora | ...................... | G02B 27/0101 |
| 2018/0081173 A1* | 3/2018 | Pasca | .................. | G02B 27/0149 |
| 2018/0189098 A1* | 7/2018 | Kim | ...................... | B60R 16/037 |
| 2019/0128780 A1* | 5/2019 | Pilon | ...................... | F02D 41/22 |

* cited by examiner

*Primary Examiner* — Chanh D Nguyen
*Assistant Examiner* — Ngan T. Pham-Lu
(74) *Attorney, Agent, or Firm* — Suiter Swantz pc llo

(57) ABSTRACT

A head-up display may include a combiner, a projector, a supplemental indicator, and a processor communicatively coupled to the supplemental indicator and the projector. The projector may be configured to project images onto or through the combiner. The combiner may be configured to present the images to a user. The supplemental indicator may be configured to visibly present supplemental information to the user. The processor may be configured to output image data signals to the projector, wherein the image data signals may be configured to cause the projector to project the images onto or through the combiner. The processor may be further configured to output supplemental indicator signals to the supplemental indicator, wherein the supplemental indicator signals may be configured to cause the supplemental indicator to visibly present the supplemental information to the user.

15 Claims, 11 Drawing Sheets

HEAD-UP DISPLAY INCLUDING SUPPLEMENTAL INDICATOR

BACKGROUND

A head-up display (HUD) allows a pilot to fly an aircraft heads-up and eyes-out while focusing not only on the real world but also on information displayed by the HUD to provide enhanced situational awareness required for a particular phase of flight.

Typically, the display area of a HUD's combiner is insufficient for providing all necessary, relevant, and important information to a pilot or a crew. Typically, HUDs are considered to be a non-primary means of displaying data, while head-down displays (HDDs) are considered to be the primary means of displaying essential flight information to the pilot. Typically, the information displayed by a HUD's combiner is conformal to the real world, and any alerts or warnings displayed by the HUD's combiner are related to a particular phase of flight by displaying large-sized monochrome text and/or flashing monochrome graphics on the HUD's combiner. Additionally, current HUD combiners are only capable of displaying monochrome text and graphics such that current HUD combiners lack the ability to indicate a severity of an alert through the use of color.

SUMMARY

In one aspect, embodiments of the inventive concepts disclosed herein are directed to a HUD. The HUD may include a combiner, a projector, a supplemental indicator, and a processor communicatively coupled to the supplemental indicator and the projector. The projector may be configured to project images onto or through the combiner. The combiner may be configured to present the images to a user. The supplemental indicator may be configured to visibly present supplemental information to the user. The processor may be configured to output image data signals to the projector, wherein the image data signals may be configured to cause the projector to project the images onto or through the combiner. The processor may be further configured to output supplemental indicator signals to the supplemental indicator, wherein the supplemental indicator signals may be configured to cause the supplemental indicator to visibly present the supplemental information to the user.

In a further aspect, embodiments of the inventive concepts disclosed herein are directed to a system. The system may include a non-transitory computer-readable medium, a processor communicatively coupled with the non-transitory computer-readable medium, and a HUD communicatively coupled with the processor. The HUD may include a combiner, a projector, a supplemental indicator, and a HUD processor communicatively coupled to the supplemental indicator and the projector. The projector may be configured to project images onto or through the combiner. The combiner may be configured to present the images to a user. The supplemental indicator may be configured to visibly present supplemental information to the user. The HUD processor may be configured to output image data signals to the projector, wherein the image data signals may be configured to cause the projector to project the images onto or through the combiner. The HUD processor may be further configured to output supplemental indicator signals to the supplemental indicator, wherein the supplemental indicator signals may be configured to cause the supplemental indicator to visibly present the supplemental information to the user.

In a further aspect, embodiments of the inventive concepts disclosed herein are directed to a method for operating a HUD. The method may include outputting, by at least one processor of a HUD, image data signals to a projector. The method may also include projecting, by the projector of the HUD, images onto or through a combiner for presentation to a user. The method may additionally include outputting, by the at least one processor of the HUD, supplemental indicator signals to at least one supplemental indicator, the supplemental indicator signals configured to cause the at least one supplemental indicator to visibly present the supplemental information to the user. The method may further include presenting, by the at least one supplemental indicator of the HUD, the supplemental information to the user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
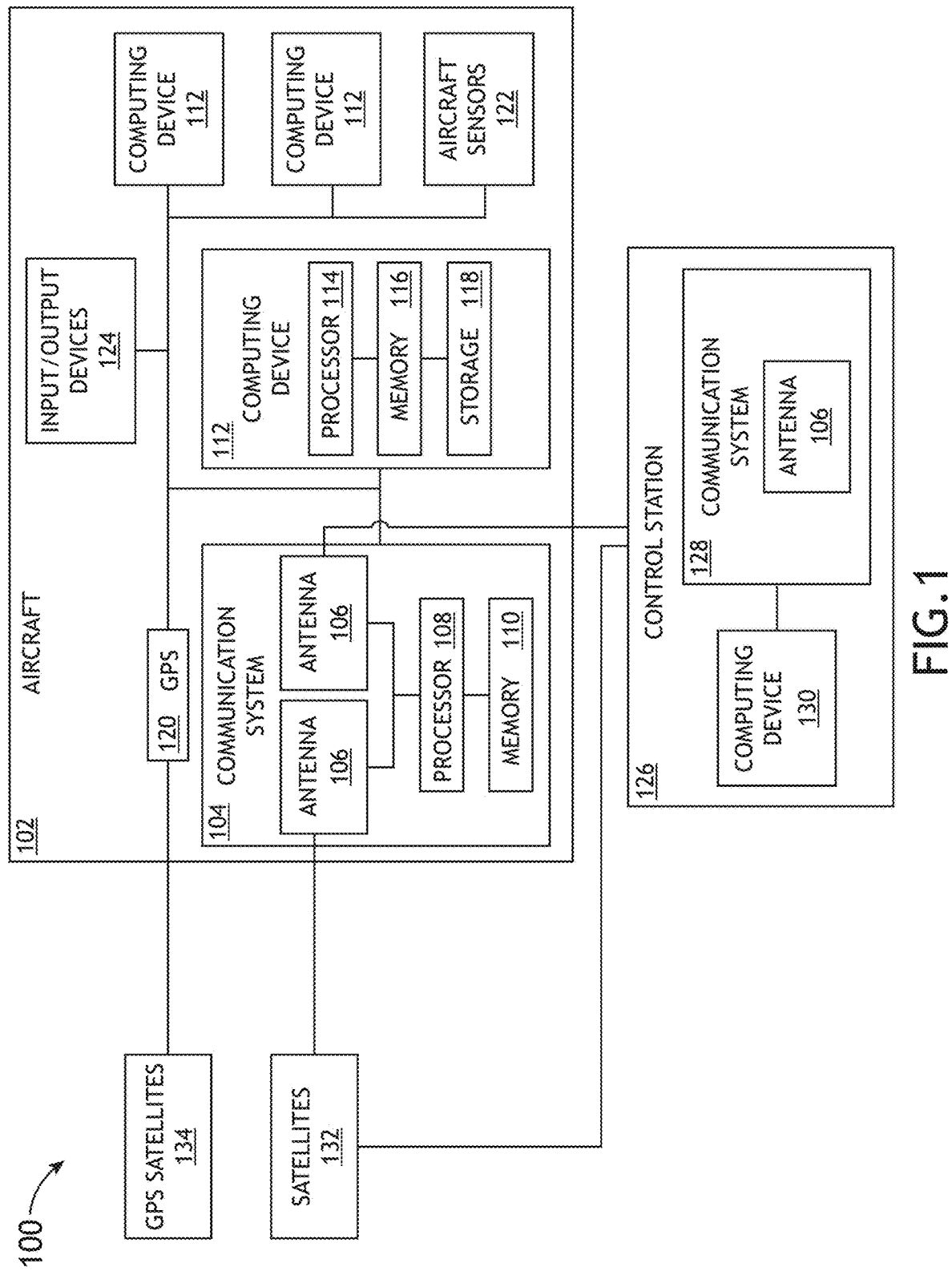
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Figure 6:
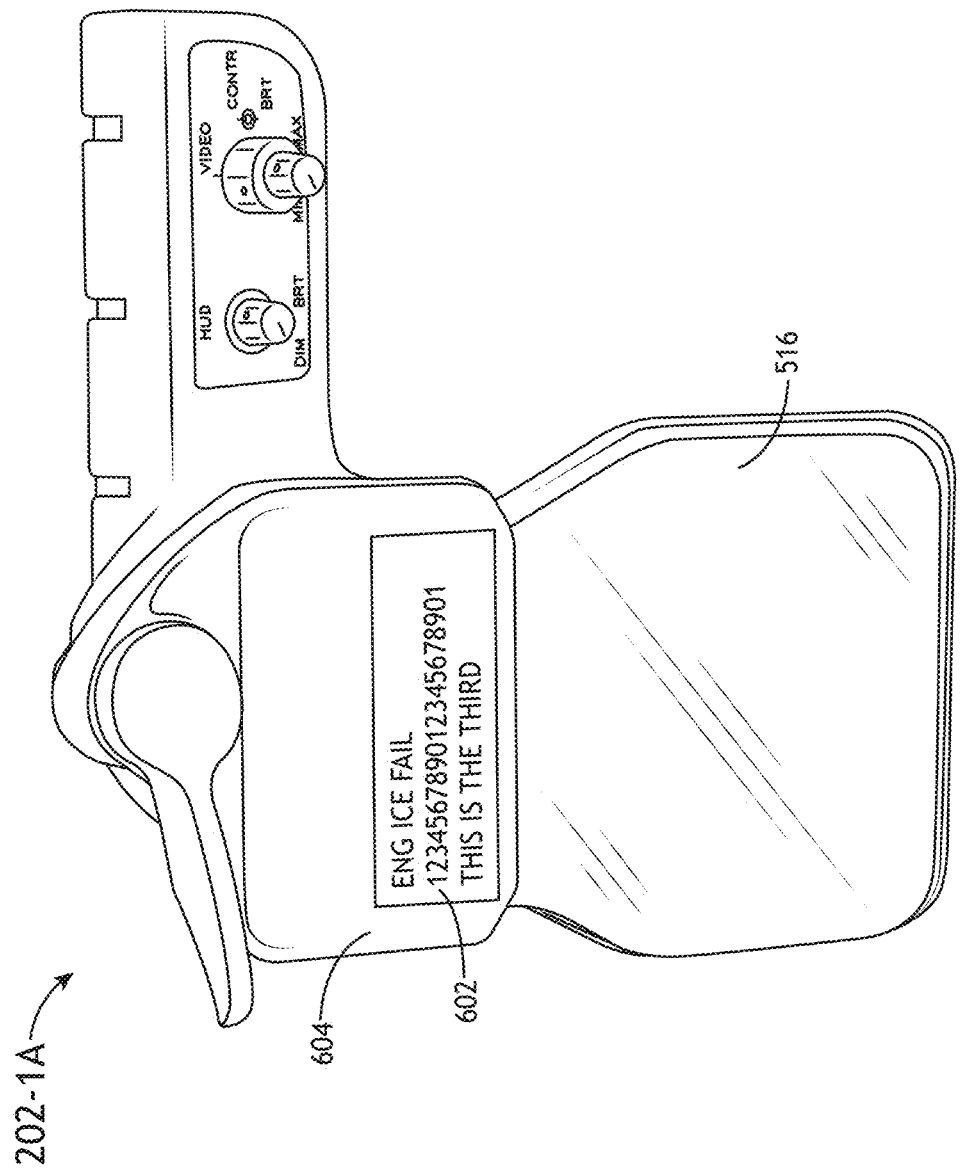
FIG. 6 is a view of an exemplary HUD of FIG. 2 according to the inventive concepts disclosed herein.
Figure 7:
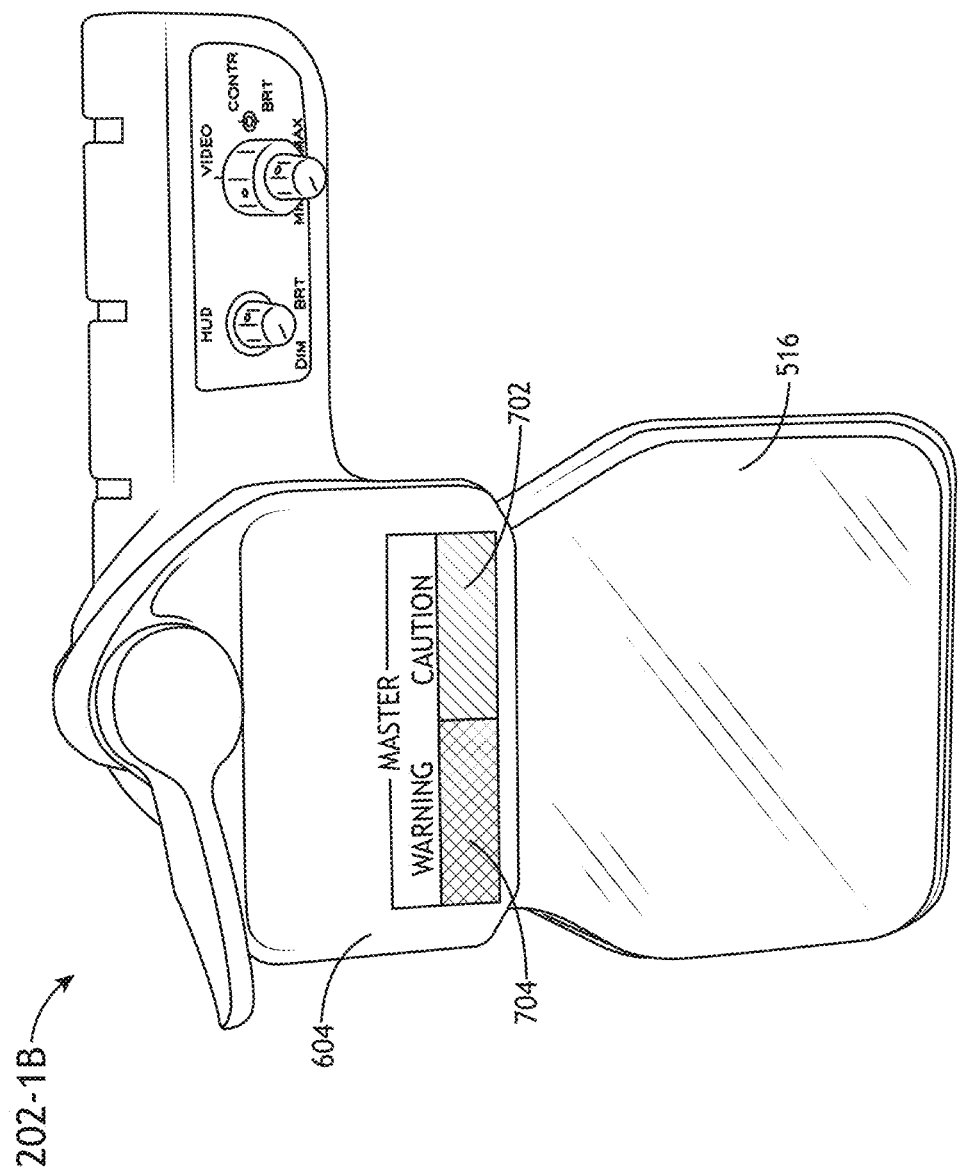
FIG. 7 is a view of an exemplary HUD of FIG. 2 according to the inventive concepts disclosed herein.
Figure 8:
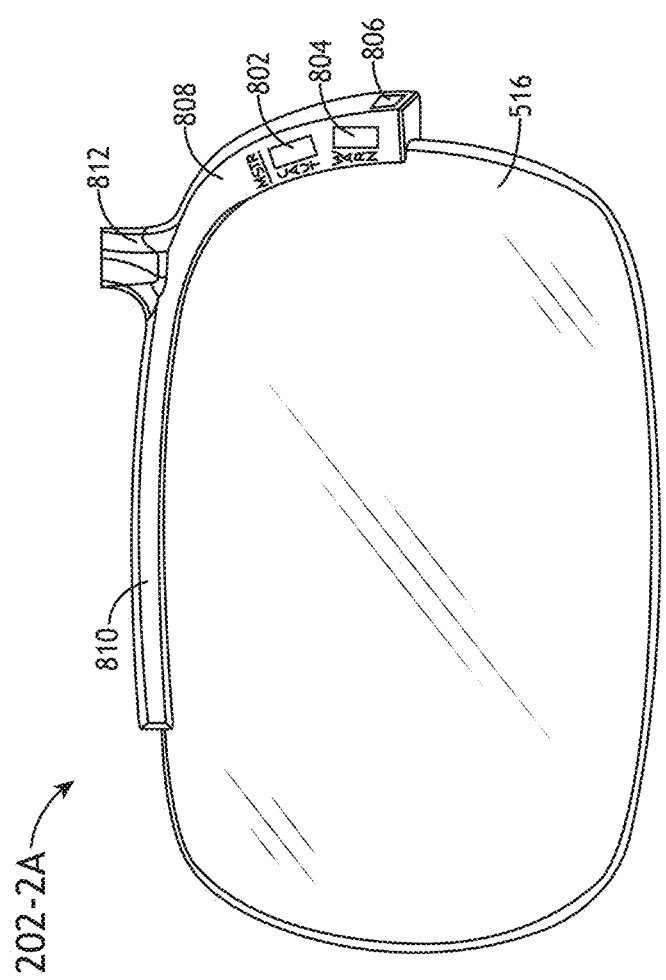
FIG. 8 is a view of an exemplary HUD of FIG. 2 according to the inventive concepts disclosed herein.
Figure 9:
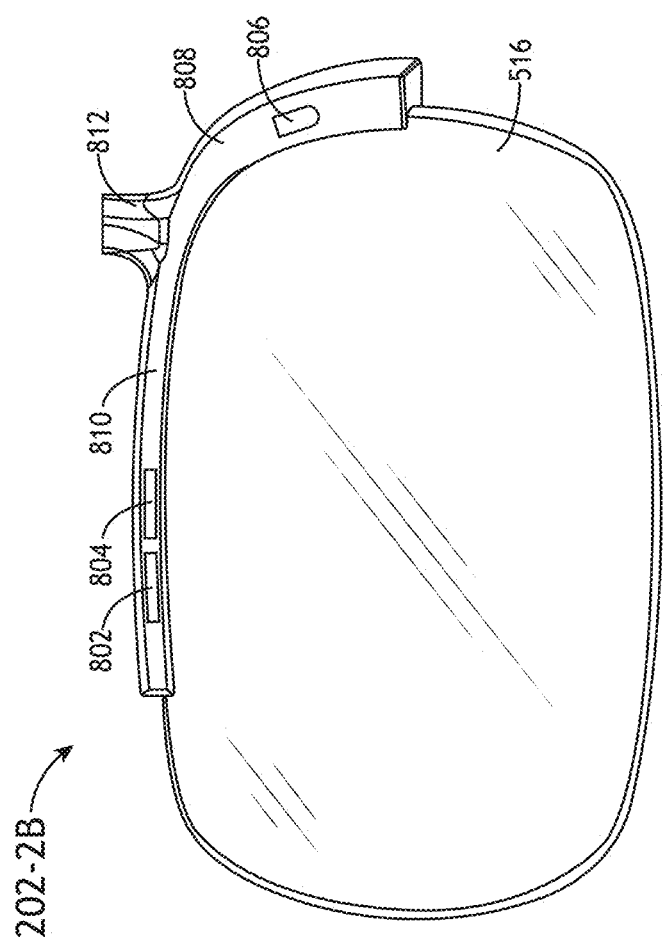
FIG. 9 is a view of an exemplary HUD of FIG. 2 according to the inventive concepts disclosed herein.

Broadly, embodiments of the inventive concepts disclosed herein are directed to system, head-up display (HUD), and a method. In some embodiments, a HUD may include at least one supplemental indicator. Supplemental indicators may be configured to present (e.g., display) indications to a user (e.g., a pilot, crew member, or operator) in addition to information displayed on a typical display area of a combiner of a HUD. For example, a supplemental indicator of a HUD may be implemented as a light emitting diode (LED) indicator or a liquid crystal display (LCD). In some embodiments, one or more supplemental indicators may be located on an arm of a combiner (e.g., an arm of a combiner of a traditional HUD, such as depicted in FIGS. 8-9) or on a top plate of a combiner (e.g., a top plate of a combiner of a compact HUD, such as depicted in FIGS. 6-7). The location of the supplemental indicators, which may be in proximity (e.g., on an arm or a top plate of a combiner) to the combiner of a HUD, may allow the supplemental indicators to supplement (e.g., augment) information that may be provided to a user while remaining within peripheral vision of the user when the user is viewing the combiner of the HUD. In some embodiments, the at least one supplemental indicator may be configured to: display at least two colors (e.g., amber and red) in order to provide information within the user's (e.g., pilot's) peripheral field of view while viewing the combiner; raise a user's awareness to a severity of an existing alert; present an indication to the user, which may not be currently displayed on the combiner or for which the combiner may not be capable of displaying (such as due to a lack of available display area on the combiner); and/or draw the user's (e.g., pilot's) attention during a critical phase of operation (e.g., flight), such as when a pilot is flying heads-up and eyes out. Additionally, the HUD may include a user feedback input device, which the user may interface with to acknowledge and/or dismiss an alert indicated by a supplemental indicator.

Referring now to FIG. 1, an exemplary embodiment of a system 100 according to the inventive concepts disclosed herein includes at least one vehicle (e.g., aircraft 102, such as an airplane), a control station 126, satellites 132, and global positioning system (GPS) satellites 134. Some or all of the aircraft 102, the control station 126, the satellites 132, and the GPS satellites 134 may be communicatively coupled at any given time.

The aircraft 102 includes at least one communication system 104, a plurality of computing devices 112 (which may also be referred to as vehicular computing devices (e.g., aircraft computing devices), or vetronics computing devices (e.g., avionics computing devices), as may be appropriate), a GPS device 120, vehicle sensors (e.g., aircraft sensors 122), and input/output devices 124, as well as other systems, equipment, and devices commonly included in vehicles, such as aircraft. Some or all of the communication system 104, the computing devices 112, the GPS device 120, the aircraft sensors 122, the input/output devices 124, and any other systems, equipment, and devices commonly included in the aircraft 102 may be communicatively coupled. While not shown, in some embodiments, the aircraft 102 may optionally include a network operations center (NOC) or include components (e.g., at least one computing device 112 and/or the communication system 104) configured to perform functionality similar to a NOC. While the system 100 is exemplarily shown as including the aircraft 102, in some embodiments the inventive concepts disclosed herein may be implemented in or on computing devices of any suitable vehicle, such as an automobile, watercraft, submersible vehicle, or a spacecraft.

The communication system 104 includes one or more antennas 106 (e.g., two antennas 106, as shown), a processor 108, and a memory 110, which are communicatively coupled. The communication system 104 (such as via one or more of the antennas 106) is configured to send and/or receive signals, data, messages, and/or voice transmissions to and/or from the control station 126, other vehicles, the satellites 132, and combinations thereof, as well as any other suitable devices, equipment, or systems. That is, the communication system 104 is configured to exchange (e.g., bi-directionally exchange) signals, data, messages, and/or voice communications with any other suitable communication system (e.g., which may be implemented similarly and function similarly to the communication system 104). Additionally, for example, the communication system 104 may be configured to exchange, send, and/or receive (e.g., via a wireless connection, a cabled connection, and/or a wired connection, a passenger broadband service connection, a safety services connection, or a combination thereof) signals, data, messages, and/or voice communications with, to, and/or from any suitable onboard device(s).

The communication system 104 may include at least one processor 108 configured to run or execute various software applications, computer code, and/or instructions stored (e.g., maintained) in at least one non-transitory computer-readable medium (e.g., at least one computer-readable medium implemented as hardware; e.g., at least one non-transitory processor-readable medium, at least one memory 110 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof). Some or all of the at least one computer-readable medium may be communicatively coupled. For example, the processor 108 may be configured to receive data from the computing devices 112 and execute instructions configured to cause a particular antenna of the antennas 106 to transmit the data as a signal(s) to another communication system (e.g., 128) of the system 100. Likewise, for example, the processor 108 may be configured to route data received as a signal(s) by a particular antenna of the antennas 106 to one or more of the computing devices 112. In some embodiments, the processor 108 may be implemented as one or more radiofrequency (RF) processors.

Each of the antennas 106 may be implemented as or may include any suitable antenna or antenna device. For example, the antennas 106 may be implemented as or include at least one electronically scanned array (ESA) (e.g., at least one active ESA (AESA)), at least one radio (e.g., at least one software defined radio (SDR)), at least one transmitter, at least one receiver, at least one transceiver, or a combination thereof.

While the communication system 104 is shown as having two antennas 106, one processor 108, and memory 110, the communication system 104 may include any suitable number of antennas 106, processors 108, and memory 110. Further, the communication system 104 may include other components, such as a storage device (e.g., solid state drive or hard disk drive), radio tuners, and controllers.

Each of the computing devices 112 of the aircraft 102 may include at least one processor 114, memory 116, and storage 118, as well as other components, equipment, and/or devices commonly included in a computing device, all of which may be communicatively coupled to one another. Each of the computing devices 112 may be configured to route data to each other as well as to the communication system 104 for transmission to an off-board destination (e.g., satellites 132, control station 126, or a combination thereof). Likewise, each computing device 112 may be configured to receive data from another computing device 112 as well as from the communication system 104 transmitted from off-board sources (e.g., satellites 132, control station 126, or a combination thereof). The computing device 112 may include or may be implemented as and/or be configured to perform the functionality of any suitable vehicular system (e.g., any suitable aircraft system, such as flight management system (FMS) (e.g., 112-1), a processing and video generation system computing device (e.g., 112-2), a crew alerting system (CAS) computing device 112-3 (e.g., an engine indication and crew alerting system (EICAS) computing device), an integrated flight information system (IFIS) computing device, an information management system (IMS) computing device, an onboard maintenance system (OMS) computing device, a terrain awareness and warning system (TAWS) computing device, and electronic instrument system (EIS) computing device). The processor 114 may be configured to run various software applications or computer code stored (e.g., maintained) in a non-transitory computer-readable medium (e.g., at least one computer-readable medium implemented as hardware; e.g., at least one non-transitory processor-readable medium, at least one memory 116 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device 118 (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof) and configured to execute various instructions or operations. Additionally, for example, the computing devices 112 or the processors 114 may be implemented as special purpose computers or special purpose processors configured (e.g., programmed) to execute instructions for performing any or all of the operations disclosed throughout. In some embodiments, the aircraft 102 may include any suitable number of computing devices 112.

The GPS device 120 receives location data from the GPS satellites 134 and may provide vehicular location data (e.g., aircraft location data) to any of various equipment/systems of the aircraft 102 (e.g., the communication system 104, the computing devices 112, the aircraft sensors 122, and the input/output devices 124). For example, the GPS device 120 may be implemented as a global navigation satellite system (GNSS) device, and the GPS satellites 134 may be implemented as GNSS satellites. The GPS device 120 may include a GPS receiver and a processor. For example, the GPS device 120 may receive or calculate location data from a sufficient number (e.g., at least four) of GPS satellites 134 in view of the aircraft 102 such that a GPS solution may be calculated. In some embodiments, the GPS device 120 may be implemented as or as part of a computing device 112, the communication system 104, navigation sensors of the aircraft sensors 122, and/or one of the input/output devices 124. The GPS device 120 may be configured to provide the location data to any of various equipment/systems of a vehicle. For example, the GPS device 120 may provide location data to the computing devices 112, the communication system 104, and the input/output devices 124. Further, while FIG. 1 depicts the GPS device 120 implemented in the aircraft 102, in other embodiments, the GPS device 120 may be implemented in or on any type of aircraft. In some embodiments, the GPS device 120 and GPS satellites 134 may be optional.

While the communication system 104, the computing devices 112, the GPS device 120, the aircraft sensors 122, and the input/output devices 124 of the aircraft 102 have been exemplarily depicted as being implemented as separate devices or systems, in some embodiments, some or all of the communication system 104, the computing devices 112, the GPS device 120, the aircraft sensors 122, and/or the input/output devices 124 may be implemented as a single integrated system or device or as any number of integrated and/or partially integrated systems and/or devices.

The control station 126 includes at least one communication system 128 and at least one computing device 130, as well as other systems, equipment, and devices commonly included in a control station. Some or all of the communication system 128, the computing device 130, and other systems, equipment, and devices commonly included in a control station may be communicatively coupled. The control station 126 may be implemented as a fixed location ground control station (e.g., a ground control station of an air traffic control tower, or a ground control station of a network operations center) located on the ground of the earth. In some embodiments, the control station 126 may be implemented as a mobile ground control station (e.g., a ground control station implemented on a non-airborne vehicle (e.g., an automobile or a ship) or a trailer). In some embodiments, the control station 126 may be implemented as an air control station implemented on an airborne vehicle (e.g., aircraft). The control station 126 may include a network operations center (NOC) or be communicatively coupled to a NOC (e.g., via any suitable network(s)).

The communication system 128 and components thereof (such as antenna 106) of the control station 126 may be implemented similarly to the communication system 104 except that, in some embodiments, the communication system 128 may be configured for operation at a fixed location. The computing device 130 and components thereof (such as a processor (not shown) and memory (not shown)) of the control station 126 may be implemented similarly to the computing devices 112.

While the antennas 106 are exemplarily depicted as being implemented in the aircraft 102 and the control station 126, in some embodiments, antennas 106 may be implemented in, on, or coupled to any other suitable device, equipment, or system, such as a computing device (e.g., a laptop computing device, a mobile computing, a wearable computing device, or a smart phone), a mobile communication system (e.g., a man pack communication system), or satellites 132.

While FIG. 1 exemplarily includes elements as shown, in some embodiments, one or more of the elements of the system 100 may be omitted, or the system 100 may include other elements. For example, one or more of the GPS satellites 134, satellites 132, and the control station 126 may be optional. Additionally, while an embodiment has been depicted as including one control station (e.g., the control station 126), other embodiments may include any number of control stations of various types positioned or moving anywhere in the system 100.

Figure 2:
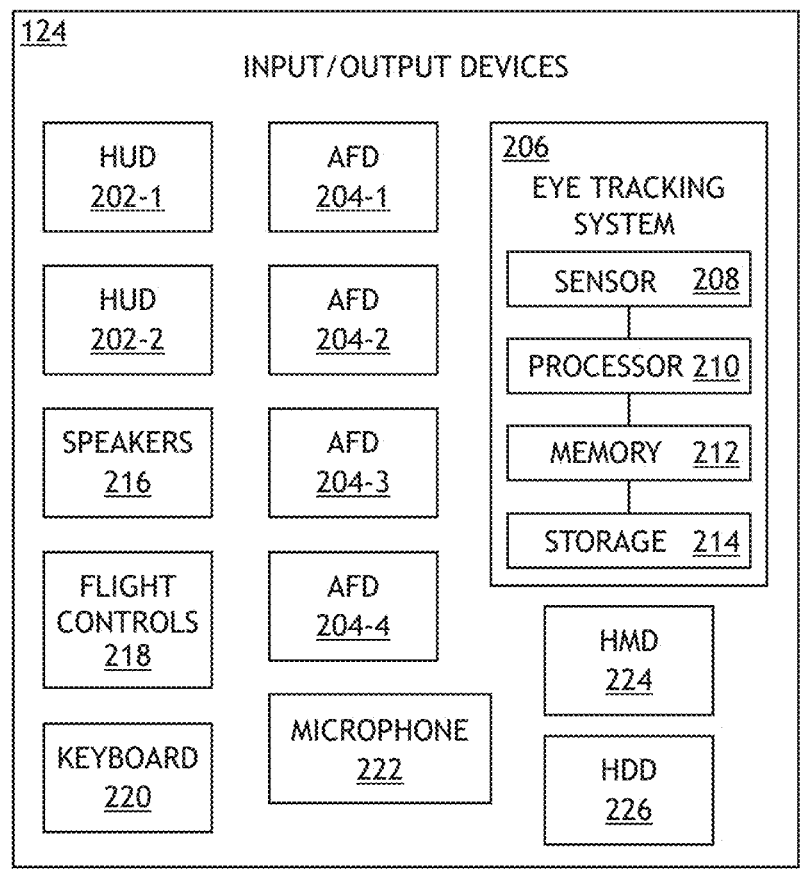
FIG. 2 is a view of the input/output devices of the aircraft of FIG. 1 according to the inventive concepts disclosed herein.

Referring now to FIG. 2, the input/output devices 124 of the aircraft 102 of FIG. 1 may include one or more displays (e.g., at least one head-up display (HUD), at least one adaptive flight display (AFD), at least one head-down display (HDD), at least one head-worn display (e.g., at least one helmet-worn display and/or at least one binocular display) or a combination thereof), at least one eye tracking system 206, speakers 216, flight controls 218, at least one keyboard 220, at least one microphone 222, or a combination thereof, some or all of which may be communicatively coupled at any given time. While FIG. 2 depicts the various exemplary input/output devices 124, the input/output devices 124 may include any suitable input/output devices. For example the input/output devices 124 may be implemented in a cockpit of an aircraft.

The input/output devices 124 may be configured to present information to a pilot of the aircraft 102 and/or configured to receive user inputs from the pilot. For example, the speakers 216 may be configured to audibly present audible information to the pilot of the aircraft 102. For example, one or more of the displays may be configured to graphically present visual information to the pilot of the aircraft 102. Additionally, for example, one or more of the displays may be configured to present synthetic vision content (e.g., streams of images as synthetic vision video), which may be used when the aircraft 102 is in a degraded visual environment.

For example, the displays of the input/output devices 124 may include two HUDs 202-1, 202-2 (which may collectively be referred to as HUDs 202), four AFDs 204-1, 204-2, 204-3, 204-4 (which may collectively be referred to as AFDs 204), a head worn display (e.g., helmet-mounted display (HMD) 224), and a head-down display (HDD) 226. In some embodiments, the AFDs 204 are implemented as HDDs. Each of the displays may be configured to present streams of images (e.g., as video or still images) to a user (e.g., a pilot). In some embodiments, the HUDs 202, AFDs 204, and/or the HDD 226 may be implemented as or include a touchscreen display. In some embodiments, one or more of the HUDs 202, AFDs 204, HDD 226, and/or the HMD 224 may include an integrated computing device (which may be implemented and function similarly to one of the computing devices 112 of FIG. 1) and/or integrated computing device components (which may be implemented and function similarly to components of one of the computing devices 112 of FIG. 1). In some embodiments, the aircraft 102 may include any suitable number of any suitable types of displays. For example, the aircraft 102 may include two HUDs 202 and two HDDs 226, such as a first HUD 202 and a first HDD 226 for a pilot and a second HUD 202 and second HDD 226 for a copilot. Each of the displays may be communicatively coupled to one or more of the computing devices 112, the communication system 104, the GPS device 120, other of the input/output devices 124, and/or the aircraft sensors 122 of FIG. 1.

The eye tracking system 206 is configured to track eye gestures, track movement of a user's eye, track a user's gaze, and/or otherwise receive inputs from a user's eyes. The eye tracking system 206 may be configured for performing fully automatic eye tracking operations of users in real time. The eye tracking system 206 may include at least one sensor 208, at least one processor 210, a memory 212, and a storage 214, as well as other components, equipment, and/or devices commonly included in an eye tracking system. The sensor 208, the processor 210, the memory 212, and the storage 214, as well as the other components, equipment, and/or devices commonly included in the eye tracking system 206 may be communicatively coupled.

Each sensor 208 may be implemented as any of various sensors suitable for an eye tracking system. For example, the at least one sensor 208 may include or be implemented as one or more optical sensors (e.g., at least one camera configured to capture images in the visible light spectrum and/or the infrared spectrum). In some embodiments, the at least one sensor 208 is one or more dedicated eye tracking system sensors. While the sensor 208 has been exemplarily depicted as being included in the eye tracking system 206, in some embodiments, the sensor 208 may be implemented external to the eye tracking system 206. For example, the sensor 208 may be implemented as an optical sensor (e.g., of the optical sensors 316 of the aircraft sensors 122) located within the aircraft 102 and communicatively coupled to the processor 210.

The processor 210 may be configured to process data received from the sensor 208 and output processed data to one or more onboard devices or onboard systems (e.g., the communication system 104, the computing devices 112, the aircraft sensors 122, other of the input/output devices 124, or a combination thereof). For example, the processor 210 may be configured to generate eye tracking data and output the generated eye tracking data to one of the computing devices 112. The processor 210 of the eye tracking system 206 may be configured to run various software applications or computer code stored (e.g., maintained) in a non-transitory computer-readable medium (e.g., memory 212 and/or storage 214) and configured to execute various instructions or operations. The processor 210 may be implemented as a special purpose processor configured to execute instructions for performing any or all of the operations disclosed throughout.

In some embodiments, some or all of the input/output devices 124 may include an integrated computing device (which may be implemented and function similarly to one of the computing devices 112 of FIG. 1) and/or integrated computing device components (which may be implemented and function similarly to components of one of the computing devices 112 of FIG. 1).

Figure 3:
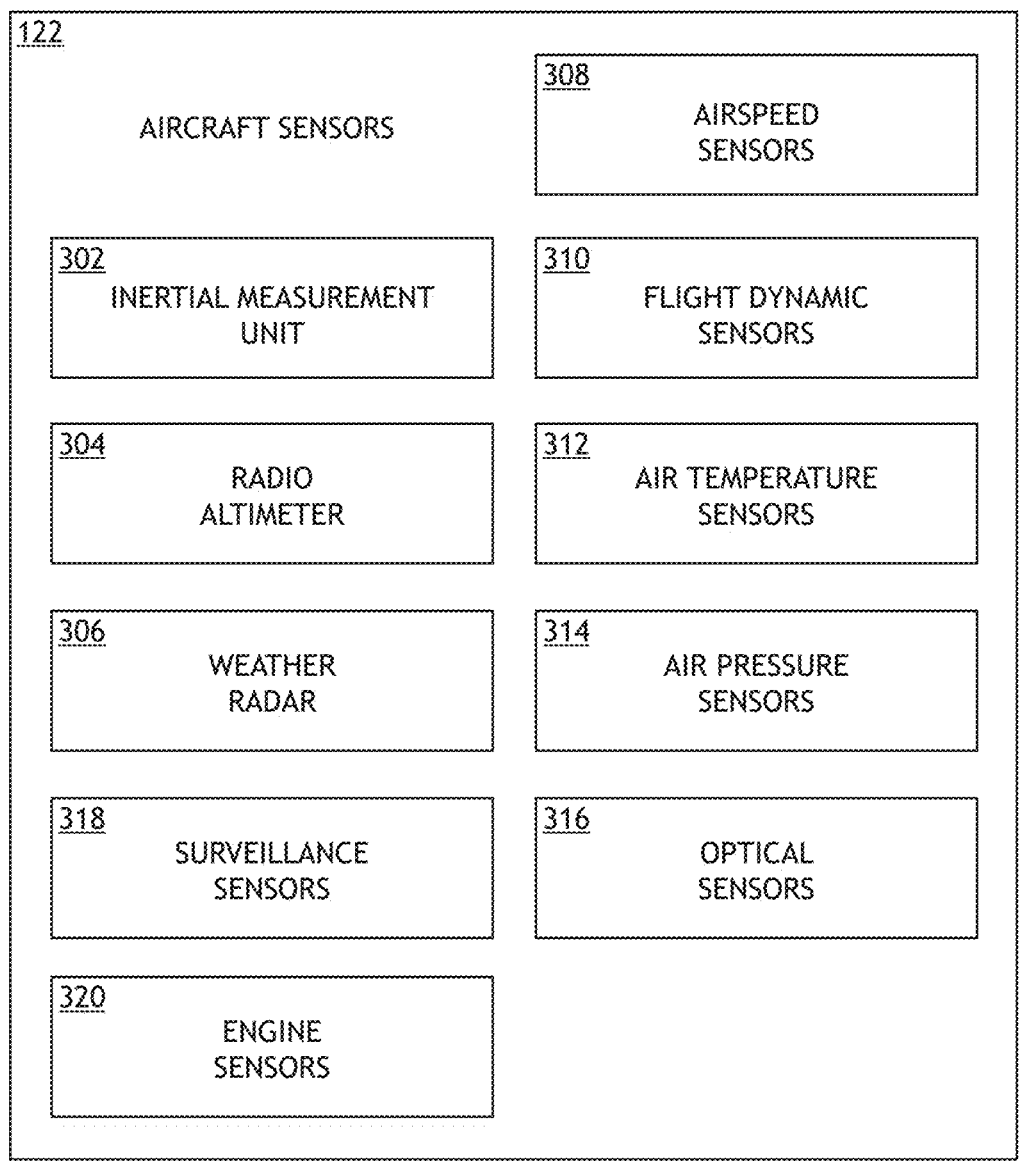
FIG. 3 is a view of the aircraft sensors of the aircraft of FIG. 1 according to the inventive concepts disclosed herein.

Referring now to FIG. 3, the aircraft sensors 122 of FIG. 1 are shown. Each of the aircraft sensors 122 may be configured to sense a particular condition(s) external or internal to the aircraft 102 or within the aircraft 102 and output data associated with particular sensed condition(s) to one or more onboard devices or onboard systems (e.g., the communication system 104, the computing devices 112, other of the aircraft sensors 122, the input/output devices 124, or a combination thereof). For example, the aircraft sensors 122 may include an inertial measurement unit 302, a radio altimeter 304, weather radar 306, airspeed sensors 308, flight dynamic sensors 310 (e.g., configured to sense pitch, bank, roll, heading, and/or yaw), air temperature sensors 312, air pressure sensors 314, optical sensors 316 (e.g., cameras configured to capture images in the visible light spectrum and/or the infrared spectrum), surveillance sensors 318, and engine sensors 320, some or all of which may be communicatively coupled at any given time. Additionally, the GPS device 120 may be considered as one of the aircraft sensors 122.

For example, at least some of the aircraft sensors 122 may be implemented as navigation sensors (e.g., the GPS device 120, the inertial measurement unit 302, a radio altimeter 304, weather radar 306, airspeed sensors 308, flight dynamic sensors 310, air temperature sensors 312, and/or air pressure sensors 314) configured to sense any of various flight conditions or aircraft conditions typically used by aircraft and output navigation data (e.g., aircraft location data, aircraft orientation data, aircraft direction data, aircraft speed data, and/or aircraft acceleration data). For example, various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. For example, the GPS device 120 and the inertial measurement unit 302 may provide aircraft location data and aircraft orientation data, respectively, to a processor (e.g., a processor of the GPS device 120, processor 114, processor 114-1, processor 114-2, processor 108, processor 210, or a combination thereof).

For example, the engine sensors 320 may be configured to measure various conditions of at least one engine of the aircraft 102.

In some embodiments, some or all of the aircraft sensors 122 may include an integrated computing device (which may be implemented and function similarly to one of the computing devices 112 of FIG. 1) and/or integrated computing device components (which may be implemented and function similarly to components of one of the computing devices 112 of FIG. 1).

Figure 4:
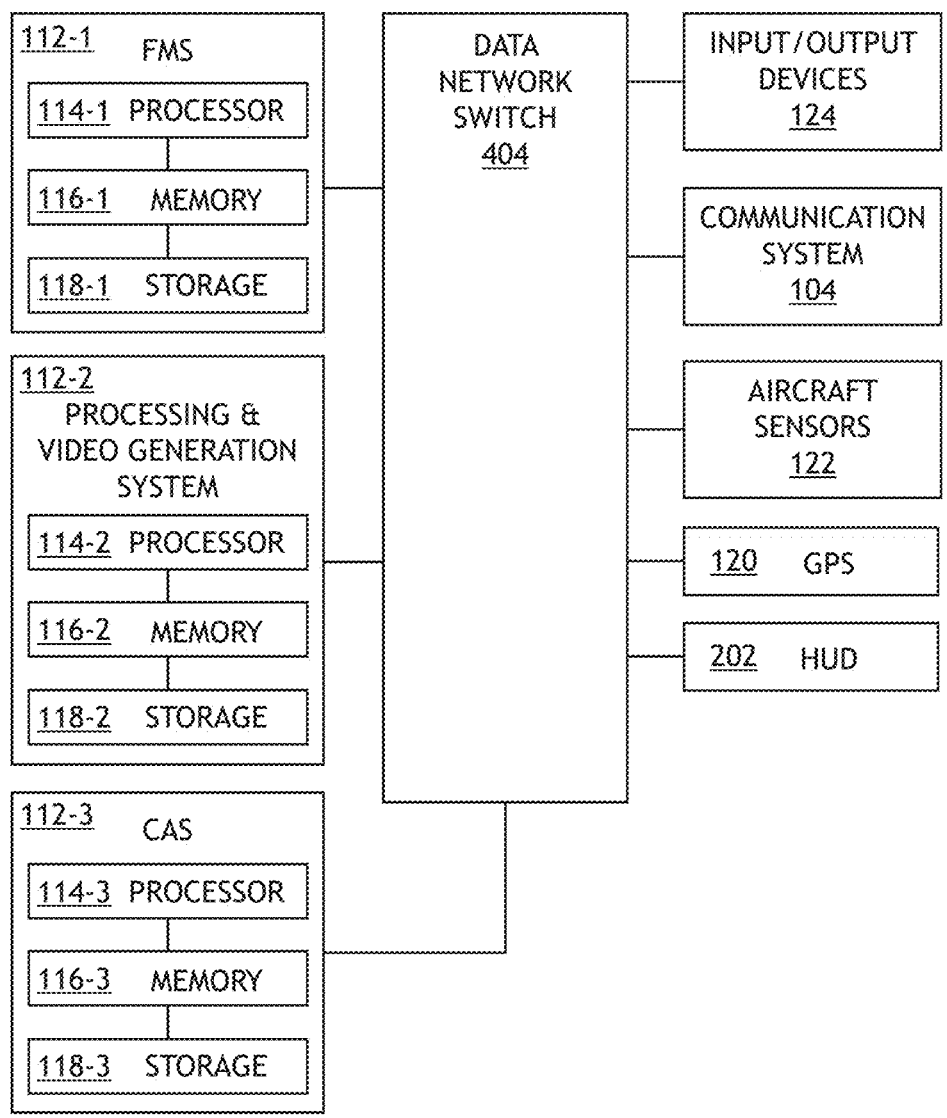
FIG. 4 is a view of exemplary devices of the aircraft of FIG. 1 communicatively coupled via a data network switch of an exemplary embodiment according to the inventive concepts disclosed herein.

Referring now to FIG. 4, various exemplary devices of the aircraft 102 of FIG. 1 communicatively coupled via a data network switch 404 (e.g., an avionics full-duplex Ethernet (AFDX) switch) are shown. For example, a plurality of computing devices 112, the input/output devices 124, the communication system 104, the aircraft sensors 122, the GPS device 120, and HUD 202 may be communicatively coupled via the data network switch 404. While the plurality of computing devices 112, the input/output devices 124, the communication system 104, the aircraft sensors 122, the GPS device 120, and the HUD 202 are exemplarily shown as being communicatively coupled via the data network switch 404, in some embodiments some or all of the plurality of computing devices 112, the input/output devices 124, the communication system 104, the aircraft sensors 122, the GPS device 120, and the HUD 202 may be communicatively coupled via any suitable data networks and via any suitable data networking components (e.g., at least one bus (e.g., Aeronautical Radio, Incorporated (ARINC) 429 busses), at least one line replacement unit (LRU), at least one data concentrator, at least one switch, at least one router, or a combination thereof).

The plurality of computing devices 112 may be implemented as and/or include a plurality of avionics computing devices (e.g., which may be implemented in one or more integrated modular avionics (IMA) cabinets). The plurality of avionics computing devices may include an FMS computing device 112-1, a processing and video generation system computing device 112-2, and a CAS computing device 112-3. Additionally, the input/output devices 124, the communication system 104, the aircraft sensors 122, the data network switch 404, the GPS device 120, and the HUD 202 may be considered to be devices of the plurality of avionics computing devices and may be implemented similarly as and function similarly as avionics devices (e.g., 112-1, 112-2, 112-3) as disclosed throughout. Each of the plurality of avionics computing devices (e.g., 112-1, 112-2, 112-3) may include components, which may be implemented and function similarly as the components of the computing device 112 shown and described with respect to FIG. 1. As such, each of the plurality of avionics computing devices may include at least one processor, memory, and storage, which may be implemented and function similarly as the processor 114, the memory 116, and the storage 118, respectively, of the computing device 112 shown and described with respect to FIG. 1. For example, the FMS computing device 112-1 may include a processor 114-1, memory 116-1, and storage 118-1, which may be implemented and function similarly as the processor 114, the memory 116, and the storage 118, respectively, of the computing device 112 shown and described with respect to FIG. 1. Additionally, for example, the processing and video generation system computing device 112-2 may include a processor 114-2, memory 116-2, and storage 118-2, which may be implemented and function similarly as the processor 114, the memory 116, and the storage 118, respectively, of the computing device 112 shown and described with respect to FIG. 1. Further, for example, the CAS computing device 112-3 may include a processor 114-3, memory 116-3, and storage 118-3, which may be implemented and function similarly as the processor 114, the memory 116, and the storage 118, respectively, of the computing device 112 shown and described with respect to FIG. 1.

The plurality of avionics computing devices (e.g., 112-1, 112-2, 112-3) and/or processors thereof (e.g., 114-1, 114-2, 114-3) may be implemented as special purpose computers (e.g., the FMS computing device 112-1, the processing and video generation system computing device 112-2, the CAS computing device 112-3) and/or special purpose processors (e.g., the processor 114-1 of the FMS computing device 112-1 programmed to execute instructions for performing FMS operations as disclosed throughout, the processor 114-2 of the processing and video generation system computing device 112-2 programmed to execute instructions for performing processing and video generation operations as disclosed throughout, the processor 114-3 of the CAS computing device 112-3 programmed to execute instructions for performing crew alerting operations as disclosed throughout) configured to execute instructions for performing any or all of the operations disclosed throughout.

The FMS computing device 112-1 may be configured to automate various in-flight tasks, such as managing a flight plan of the aircraft 102. The processor 114-1 of the FMS computing device 112-1 may be configured to perform any of various, suitable operations, which are commonly performed by FMSs, as would be appreciated by those skilled in the art. For example, the FMS computing device 112-1 may be configured to receive aircraft sensor data (e.g., data associated with aircraft location and orientation, attitude, and/or airspeed data) from one or more of the aircraft sensors 122, access flight plan data (e.g., data associated with a current flight plan) maintained within the memory 116-1, and output FMS data based thereon to the HUD 202, one or more of the input/output devices 124, the communication system 104, the processing and video generation system 112-2, and/or the CAS computing device 112-3. In addition to performing commonly performed operations, some embodiments include the processor 114-1 of the FMS computing device 112-1 being configured (e.g., programmed) to perform additional operations as disclosed throughout.

The processor 114-1 may be configured to generate a three-dimensional flight path from a position and orientation of the aircraft 102 to a waypoint of a flight plan. The processor 114-1 may be configured to output the generated flight path to the processing and video generation system 112-2, the CAS computing device 112-3, the HUD 202, and/or a different onboard or off-board computing device.

In some embodiments, the processor 114-1 may be configured to determine (e.g., by receiving data from the aircraft sensors 122) at least one aircraft state (e.g., position, orientation, and/or detected trajectory) of the aircraft 102 in real time. The processor 114-1 may be configured to output (e.g., constantly output or frequently output) data associated with the at least one determined aircraft state of the aircraft 102 to the HUD 202, the processing and video generation system computing device 112-2, and/or the CAS computing device 112-3 for use in presenting (e.g., graphically and/or audibly presenting) such information to the pilot of the aircraft 102. The processor 114-1 may also be configured to compare (e.g., iteratively compare or constantly compare) the at least one determined aircraft state of the aircraft 102 against a flight plan and/or a generated flight path. By comparing the at least one determined aircraft state of the aircraft 102 against the flight plan and/or generated flight path, the processor 114-1 may be configured to determine at least one deviation (e.g., a lateral position deviation, a vertical position deviation, an airspeed deviation (e.g., a vertical descent rate deviation, a lateral airspeed deviation), an orientation deviation, or a combination thereof) of the aircraft 102 from the flight plan and/or generated flight path. The processor 114-1 may be configured to output data associated with the at least one deviation to the processing and video generation system 112-2, the HUD 202, the CAS computing device 112-3, and/or a different onboard or off-board computing device.

In some embodiments, the processor 114-1 of the FMS computing device 112-1 may be configured to perform functionality of the processing and video generation system computing device 112-2 and/or the CAS computing device 112-3 as described below and throughout. For example, the FMS computing device 112-1 may include an integrated processing and video generation system and CAS, and the FMS computing device 112-1 may be programmed to perform functionality of the processing and video generation system computing device 112-2 and the CAS computing device 112-3 as described below and throughout. In such embodiments, the processing and video generation system computing device 112-2 may be optional.

The FMS 112-1 may include software, code, and/or processor-executable instructions stored (e.g., maintained) in a non-transitory computer-readable medium (e.g., the memory 116-1 and/or storage 118-1). By executing the software, code, and/or processor-executable instructions, the processor 114-1 may be configured to perform any of various FMS operations according to inventive concepts as disclosed throughout.

The processing and video generation system computing device 112-2 may be configured to receive data from any of various onboard or off-board devices. For example, the processing and video generation system computing device 112-2 may be configured to receive FMS data (e.g., data associated with a flight plan, at least one determined aircraft state, and/or a generated flight path) and/or alert data (e.g., from the CAS computing device 112-3). Additionally, for example, the processing and video generation system computing device 112-2 may be configured to exchange (e.g., send and/or receive) data with the HUD 202, other of the input/output devices 124, the communication system 104, the aircraft sensors 122, and the GPS 120.

The processing and video generation system computing device 112-2 may be configured to process data received from any of various computing devices (e.g., the FMS computing device 112-1 and/or the CAS computing device 112-3) and to output data (e.g., video data and/or audio data) to any of various devices (e.g., HUD 202 and/or other input/output devices 124). For example, the processor 114-2 of the processing and video generation system computing device 112-2 may be configured to receive FMS data from the FMS computing device 112-1, and based at least in part on the received data from the FMS computing device 112-1, the processor 114-2 of the processing and video generation system computing device 112-2 may be configured to generate graphical data to output to the HUD 202 and/or other of the input/output devices 124.

In some embodiments, the processor 114-2 may be configured to receive the data associated with the at least one determined aircraft state of the aircraft 102 from the FMS system computing device 112-1 for use in presenting (e.g., graphically and/or audibly presenting) such information to the pilot of the aircraft 102. Additionally, the processor 114-2 may be configured to receive data associated with the at least one deviation from the FMS computing device 112-1 and/or a different onboard or off-board computing device. For example, if a deviation exceeds a predetermined threshold deviation, the processor 114-2 may be configured to generate alert data. For example, the processor 114-2 may be configured to output alert data to the HUD 202 for supplemental indication via at least one supplemental indicator (e.g., 508, 602, 702, 704, 802, and/or 804) and/or one or more other input/output devices 124 (e.g., HDD 226) configured to alert a pilot.

In some embodiments, the processor 114-2 may be configured to receive user feedback data (e.g., data associated with user feedback), such as alert acknowledgement data (e.g., data associated with a user acknowledging an alert) and/or alert dismissal data (e.g., data associated with a user dismissing an alert), from an input device (e.g., HUD user feedback input device 518 of the HUD 202 or another input device of the input/output devices). In response to receiving the user feedback data, the processor 114-2 may be configured to cease outputting alert data to the HUD 202 for supplemental indication via at least one supplemental indicator (e.g., 508, 602, 702, 704, 802, and/or 804) and/or one or more other input/output devices 124 (e.g., HDD 226) configured to alert a pilot.

In some embodiments, the processing and video generation system computing device 112-2 may be configured to perform synthetic vision system (SVS) functionality, for example, by utilizing synthetic image data to construct real-time synthetic views of the environment (e.g., the world outside of the aircraft) based at least on the at least one determined aircraft state relative to the earth. For example, the processor 114-2 may be configured to perform SVS operations so as to improve pilot's ability to safely fly and/or land the aircraft 102 in a degraded visual environment, such as rain, fog, darkness, smoke, snow, or dust, where the pilot might not be able to perceive the surrounding environment without synthetic views.

In some embodiments, the processor 114-2 of the processing and video generation system computing device 112-2 may be configured to perform functionality of the FMS computing device 112-1 and/or the CAS computing device 112-3 as described above and throughout. For example, the processing and video generation system computing device 112-2 may include an integrated FMS and CAS, and the processing and video generation system computing device 112-2 may be programmed to perform functionality of the FMS computing device 112-1 as described above and throughout. In such embodiments, a dedicated FMS computing device and/or a dedicated CAS computing device may be optional.

Additionally, the processor 114-2 may be configured to perform any of various, suitable operations, which are commonly performed by video processing and/or audio processing computing devices, as would be appreciated by those skilled in the art. In addition to performing commonly performed operations, some embodiments include the processor 114-2 being configured (e.g., programmed) to perform additional operations as disclosed throughout.

The processing and video generation system computing device 112-2 may include software, code, and/or processor-executable instructions stored (e.g., maintained) in a non-transitory computer-readable medium (e.g., the memory 116-2 and/or storage 118-2). By executing the software, code, and/or processor-executable instructions, the processor 114-2 may be configured to perform any of various operations according to inventive concepts as disclosed throughout.

The CAS computing device 112-3 may be configured to receive (e.g., collect) data from any suitable onboard and/or off-board device(s) such as the aircraft sensors 122, generate alert data, and output the alert data to the HUD 202 or another onboard device for presentation to the pilot (such as via at least one HUD supplemental indicator (e.g., 508)). For example, the CAS computing device 112-3 may be implemented as an engine indication and crew alerting system (EICAS) computing device. While the CAS computing device is exemplarily depicted and described as a crew alerting system, some embodiments may include any suitable computing device configured to output alert data to the HUD 202.

In some embodiments, the processor 114-3 of the CAS computing device 112-3 may be configured to perform functionality of the FMS computing device 112-1 and/or the processing and video generation system computing device 112-2 as described above and throughout. For example, the CAS computing device 112-3 may include an integrated FMS and processing and video generation system, and the CAS computing device 112-3 may be programmed to perform functionality of the FMS computing device 112-1 and the processing and video generation system computing device 112-2 as described above and throughout. In such embodiments, a dedicated FMS computing device and a dedicated processing and video generation system computing device may be optional.

Additionally, the processor 114-3 may be configured to perform any of various, suitable operations, which are commonly performed by CAS computing devices, as would be appreciated by those skilled in the art. In addition to performing commonly performed operations, some embodiments include the processor 114-3 being configured (e.g., programmed) to perform additional operations as disclosed throughout.

While the FMS computing device 112-1, the processing and video generation computing device 112-2, and the CAS computing device 112-3 of the aircraft 102 have been exemplarily depicted as being implemented as separate avionics computing devices, in some embodiments, some or all of the FMS computing device 112-1, the processing and video generation computing device 112-2, and the CAS computing device 112-3 may be implemented as a single integrated computing device or as any number of integrated and/or partially integrated computing devices.

Additionally, in some embodiments, the data network switch 404 may be implemented similarly as and function similarly to one of the avionics computing devices (e.g., 112-1, 112-2, and/or 112-3) or include components that function similarly to components of one of the avionics computing devices. For example, the data network switch 404 may include an integrated computing device (which may be implemented and function similarly to one of the computing devices 112 (e.g., one of the avionics computing devices (e.g., 112-1, 112-2, and/or 112-3)) and/or integrated computing device components (which may be implemented and function similarly to components of one of the computing devices 112 of FIG. 1).

Further, while the plurality of avionics computing devices has been exemplarily depicted and described with respect to FIG. 4 as including the FMS computing device 112-1, the processing and video generation computing device 112-2, and the CAS computing device 112-3, in some embodiments, the plurality of avionics computing devices may omit one or more of the described and depicted avionics computing devices, include additional numbers of such avionics computing devices, and/or include other types of suitable avionics computing devices.

Figure 5A:
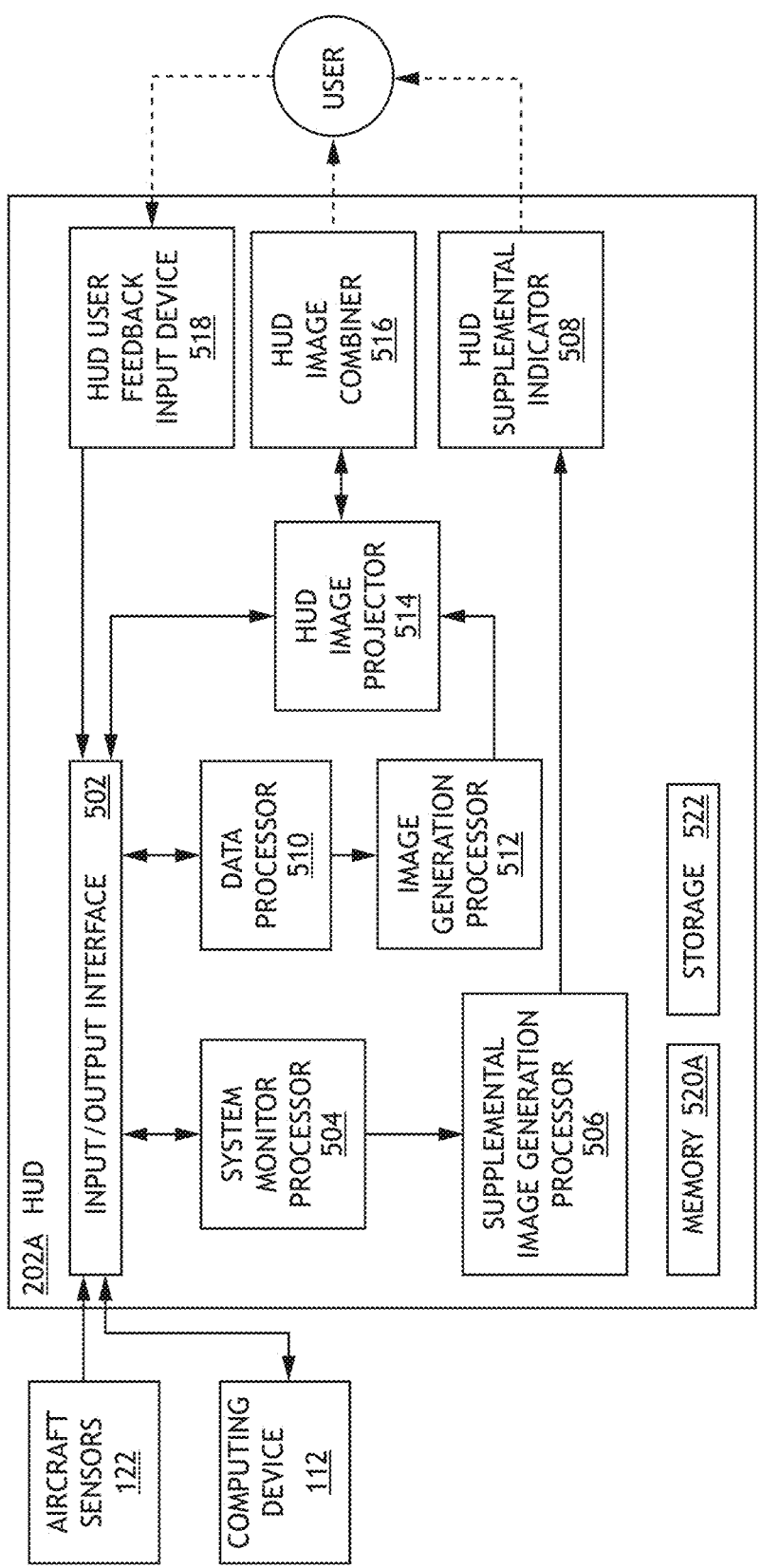
FIG. 5A is an exemplary diagram of a HUD of FIG. 2 according to the inventive concepts disclosed herein.

Referring now to FIG. 5A, an exemplary diagram of a HUD 202A, which may be one of the HUDs 202 of FIG. 2, according to the inventive concepts disclosed herein is depicted. For example, the HUD 202A may be configured to provide aircraft level caution and warning indication, HUD level caution and warning, and any indications that require the pilot to take immediate action. Additionally, the HUD 202A may be able to receive acknowledgement from the pilot and can electronically forward that acknowledgement to another aircraft device and/or system. For example, the HUD 202A may be communicatively coupled to at least one computing device 112 (e.g., the FMS computing device 112-1, the processing and video generation system computing device 112-2, and/or the CAS computing device 112-3) and the aircraft sensors 122. Based on data received from the computing device 112 and the aircraft sensors 122, the HUD 202A may be configured to perform operations to graphically present information (e.g., information associated with attitude, airspeed, heading, flight path, and approach path guidance) by displaying text, symbols, and/or graphics to a user (e.g., a pilot) via a HUD image combiner 516 and at least one HUD supplemental indicator 508. The HUD 202A may also be configured to receive feedback from a user via a HUD user feedback input device 518 and to electronically forward such user feedback to another vehicle device and/or system.

The HUD 202A may include an input/output interface 502, a plurality of processors (e.g., a system monitor processor 504, a supplemental image generation processor 506, a data processor 510, and/or an image generation processor 512), a HUD image projector 514, the HUD image combiner 516, the at least one HUD supplemental indicator 508, the HUD user feedback input device 518, and at least one non-transitory computer readable medium (e.g., memory 520A and storage 522), as well as any suitable components typically included in HUDs. Some or all of the input/output interface 502, the plurality of processors (e.g., the system monitor processor 504, the supplemental image generation processor 506, the data processor 510, and/or the image generation processor 512), the HUD image projector 514, the HUD image combiner 516, the at least one HUD supplemental indicator 508, the HUD user feedback input device 518, the memory 520A, and the storage 522 may be communicatively coupled.

In some embodiments, a user (e.g., a pilot) may be able to interface with one or more of the input/output devices 124 (e.g., cockpit instrumentation and controls), which may be communicatively coupled to one or more of the computing devices 112, to control information to be displayed on the HUD image combiner 516 of the HUD 202A. Additionally, the user may be able to interface with the HUD user feedback input device 518 to instruct the HUD 202A to display or cease displaying particular information on the HUD image combiner 516 and/or the at least one HUD supplemental indicator 508.

The input/output interface 502 may act as input/output subsystem configured to interconnect an input/output system of data links from the aircraft sensors 122 and the computing devices 112 (as well any other devices of the aircraft 102) with electronic components of the HUD 202A. For example, the input/output interface 502 may include or be implemented as at least one data port and/or at least one data bus.

The system monitor processor 504 may be configured to monitor health and performance of individual components, as well as the overall system, of the HUD 202A. The system monitor processor 504 may be configured to receive and process input data (e.g., aircraft sensor data, computing device data, and/or HUD user feedback device data received via the input/output interface 502 from the aircraft sensors 122, one or more of the computing devices 112, and/or the HUD user feedback device 518) and output data (e.g., supplemental indicator generation instructions) necessary for the supplemental image generation processor 506 to output data to, control, and/or operate the at least one HUD supplemental indicator 508. The system monitor processor 504 may be implemented as a special purpose processor configured to execute instructions for performing any or all of the operations disclosed throughout.

The supplemental image generation processor 506 may be configured to output signals to, control, and/or operate the at least one HUD supplemental indicator 508. The supplemental image generation processor 506 may be configured to receive and process input data received from the system monitor processor 504 and output signals (e.g., HUD supplemental indicator 508 data signals (e.g., content data signals (e.g., associated with text and/or symbols), color signals, flash frequency signals, indicator activation data signals, indicator deactivation data signals, and/or control signals) necessary for the supplemental image generation processor 506 to control and/or operate the at least one HUD supplemental indicator 508.

For example, if the at least one HUD supplemental indicator 508 is implemented as an LCD indicator (e.g., 602 as shown in FIG. 6), the supplemental image generation processor 506 be configured to output, to the at least one HUD supplemental indicator 508, graphical data, which may include information associated with graphical content (e.g., text and/or symbol content) and/or a color scheme (e.g., a color or combination of different colors (e.g., black, white, amber, red, blue, green, and/or a combination thereof)) for displaying all or various portion(s) of the graphical content.

For example, if the at least one HUD supplemental indicator 508 is implemented as at least one LED indicator (e.g., 702 and/or 704 (as shown in FIG. 7) and/or 802 and/or 804 (as shown in FIGS. 8-9)), the supplemental image generation processor 506 may be configured to output signals, to the at least one HUD supplemental indicator 508, to control, activate, and/or deactivate one or more of the at least one LED indicator.

The supplemental image generation processor 506 may be implemented as a special purpose processor configured to execute instructions for performing any or all of the operations disclosed throughout.

The at least one HUD supplemental indicator 508 may include or be implemented as any suitable indicator or combination of indicators located on the HUD 202A in proximity to the HUD image combiner 516. For example, the at least one HUD supplemental indicator 508 may include or be implemented as at least one illuminator indicator (e.g., at least one LED indicator (e.g., 702 and/or 704 (as shown in FIG. 7) and/or 802 and/or 804 (as shown in FIGS. 8-9)), a display indicator (e.g., an LCD indicator (e.g., 602 as shown in FIG. 6)), or a combination thereof. The at least one HUD supplemental indicator 508 may be configured to present (e.g., display) information to a user (e.g., a pilot). The information presented by the at least one HUD supplemental indicator 508 may be information that is in addition to information already being displayed on the HUD image combiner 202A. Additionally, a particular HUD supplemental indicator 508 may be configured to notify a user to view more detailed information displayed by the HDD 226 or another display device of the aircraft 102. In some embodiments, due to the at least one HUD supplemental indicator's 508 proximity to the HUD image combiner 516, the at least one HUD supplemental indicator 508 is configured to augment information that may be provided to a user while remaining within peripheral vision of the user when the user is viewing the HUD image combiner 516 such that the at least one HUD supplemental indicator 508 may capture the user's attention while viewing the HUD image combiner 516. For example, in some embodiments, the at least one HUD supplemental indicator 508 may be configured to: display at least two colors (e.g., amber and red) to provide information within the user's (e.g., pilot's) peripheral field of view while viewing the combiner; raise a user's awareness to a severity of an existing alert; present an indication to the user, which might not currently be displayed on the HUD image combiner 516 or for which the HUD image combiner 516 might not be capable of displaying (such as due to a lack of available display area on the HUD image combiner 516 and/or due to a monochromatic capability of the HUD image combiner 516); and/or draw the user's (e.g., pilot's) attention during a critical phase of operation (e.g., flight), such as when a pilot is flying heads-up and eyes out.

The HUD user feedback input device 518 may be configured to receive user inputs (e.g., feedback) from the user. For example, in response to activation of one or more of the at least one HUD supplemental indicator 508, the user may interface with the HUD user feedback input device 518 so as to acknowledge or dismiss information (e.g., an alert or notification) presented by the at least one HUD supplemental indicator 508. The HUD user feedback input device 518 may be configured to detect the user's feedback (e.g., acknowledgement of or dismissal of) associated with the information (e.g., an alert or notification) presented by the at least one HUD supplemental indicator 508. Upon detecting the user's feedback, the HUD user feedback input device 518 may be configured to output user feedback data associated with the user's feedback to at least one processor (e.g., the system monitor processor 504 and/or the data processor 510). Upon receiving the user feedback data, the at least one processor may be configured to execute instructions for altering the information to be displayed by the at least one HUD supplemental indicator 508. For example, if a particular HUD supplemental indicator 508 is lit up as an alert, the user may choose to acknowledge and dismiss the alert. The user may interface with the HUD user feedback input device 518, which causes data to be sent to at least one processor of the HUD 202A that in turn may cause the particular HUD supplemental indicator 508 to deactivate.

Additionally, for example, in response to noticing an alert displayed by the at least one HUD supplemental indicator 508, a pilot may perform a flight procedure. When the flight procedure is completed, the pilot may interface with the HUD user feedback input device 518 to provide user feedback to the HUD 202A and/or any other aircraft device or system (e.g., the FMS computing device 112-1) that the flight procedure was performed. For example, if the alert (e.g., displayed by the at least one HUD supplemental indicator 508) is for the pilot to radio air traffic control (ATC), after radioing air traffic control (ATC), the pilot may press a button on the HUD user feedback input device 518 to dismiss the alert and to forward user feedback data associated with the completion of the radioing to another aircraft device or system (e.g., the FMS computing device 112-1) that the radioing ATC procedure was performed.

In some embodiments, the HUD user feedback input device 518 may include or be implemented as a physical button (e.g., a dedicated physical button (e.g., 806) or a particular HUD supplemental indicator 508 implemented as a physical button illuminator indicator), soft button displayed on a touchscreen display (e.g., a dedicated touchscreen display or a particular HUD supplemental indicator 508 implemented as a touchscreen display HUD supplemental indicator (e.g., 602)), at least one touch-sensitive sensor (e.g., a capacitive sensor, a resistive sensor, a sensor, or a particular HUD supplemental indicator 508 implemented as a touch-sensitive illuminator HUD supplemental indicator (e.g., 702, 704), a microphone (e.g., which may include elements similar to and function similar to the microphone 222 of FIG. 2) of a voice recognition system (e.g., which may include the microphone, a processor, and memory), a sensor (e.g., an optical sensor or a camera) of an eye tracking system (e.g., which may include elements similar to and function similar to the eye tracking system 206 of FIG. 2), a sensor of a gesture recognition system (e.g., which may include the sensor, a processor, and memory), or a combination thereof. For example, the HUD user feedback input device 518 may be configured to detect user feedback as a button press, hand gesture, eye movement, voice command, a touch, or the like.

While FIG. 5A exemplarily depicts each of the HUD user feedback input device 518 and the at least one HUD supplemental indicator 508 as being distinct elements, in some embodiments, the HUD user feedback input device 518 and a particular HUD supplemental indicator 508 may be integrated in the same device. For example, a particular HUD supplemental indicator 508 may include the HUD user feedback input device 518 (e.g., the particular HUD supplemental indicator 508 implemented as a physical button illuminator indicator configured to present information and provide user feedback or the particular HUD supplemental indicator 508 implemented as a touchscreen display HUD supplemental indicator configured to present information and provide user feedback).

The data processor 510 may be configured to receive and process input data (e.g., aircraft sensor data and/or computing device data received via the input/output interface 502 from the aircraft sensors 122 and/or one or more of the computing devices 112) and output data (e.g., image generation instructions) necessary for the image generator processor 512 to generate pixelated images. The data processor 510 may be implemented as a special purpose processor configured to execute instructions for performing any or all of the operations disclosed throughout.

The image generation processor 512 may be configured to generate a stream of image data (e.g., associated with pixelated images) based at least on the data received from the data processor 510. The image generation processor 512 may be configured to output the generated image data to the HUD image projector 514. The image generation processor 512 may be implemented as a special purpose processor configured to execute instructions for performing any or all of the operations disclosed throughout.

The HUD image projector 514 may be configured to receive the generated image data from the image generation processor 512 and project a stream of images onto or through the HUD image combiner 516 to be displayed to the pilot (e.g., at optical infinity). For example, the HUD image combiner 516 may be implemented as an overhead refractive combiner or a waveguide combiner. For example, if the HUD image combiner 516 is implemented as an overhead refractive combiner, the HUD image projector 514 may be configured to project a stream of images onto the HUD image combiner 516 to be displayed to the pilot. Additionally, for example, if the HUD image combiner 516 is implemented as a waveguide combiner, the HUD image projector 514 may be configured to project a stream of images through waveguides in the HUD image combiner 516 such that the HUD image combiner 516 displays the stream of images as collimated images to the pilot. The HUD image combiner 516 may be configured to display the projected stream of images to the user (e.g., the pilot). The HUD combiner 516 may be at least partially transparent such that the pilot is able to view the displayed stream of images while viewing an environment (e.g., outside of the aircraft 102) through HUD combiner 516. In some embodiments, the HUD image projector 514 and the HUD image combiner 516 may be implemented as a single integrated element.

While FIG. 5A exemplarily depicts each of the system monitor processor 504, the data processor 510, the image generation processor 512, and the supplemental image generation processor 506 as being distinct processors, in some embodiments, some or all of the system monitor processor 504, the data processor 510, the image generation processor 512, and the supplemental image generation processor 506 may be implemented on a single processor or across any number of distributed processors. For example, the data processor 510 and the system monitor processor 504 may be implemented as or on a single processor; for example, the single processor may include multiple cores such that a first core is configured to perform the functionality of the data processor 510 and a second core is configured to perform the functionality of the system monitor processor 504. Additionally, for example, the image generation processor 512 and the supplemental image generation processor 506 may be implemented as or on a single processor. Further, for example, one or more of the system monitor processor 504, the data processor 510, the image generation processor 512, and the supplemental image generation processor 506 may be implemented as or on any number and any types of processors.

The HUD 202A may include software, code, and/or processor-executable instructions stored (e.g., maintained) in at least one non-transitory computer-readable medium (e.g., the memory 520A and/or storage 522). By executing the software, code, and/or processor-executable instructions, at least one processor (e.g., the system monitor processor 504, the data processor 510, the image generation processor 512, and/or the supplemental image generation processor 506) may be configured to perform any of various operations according to inventive concepts as disclosed throughout.

Figure 5B:
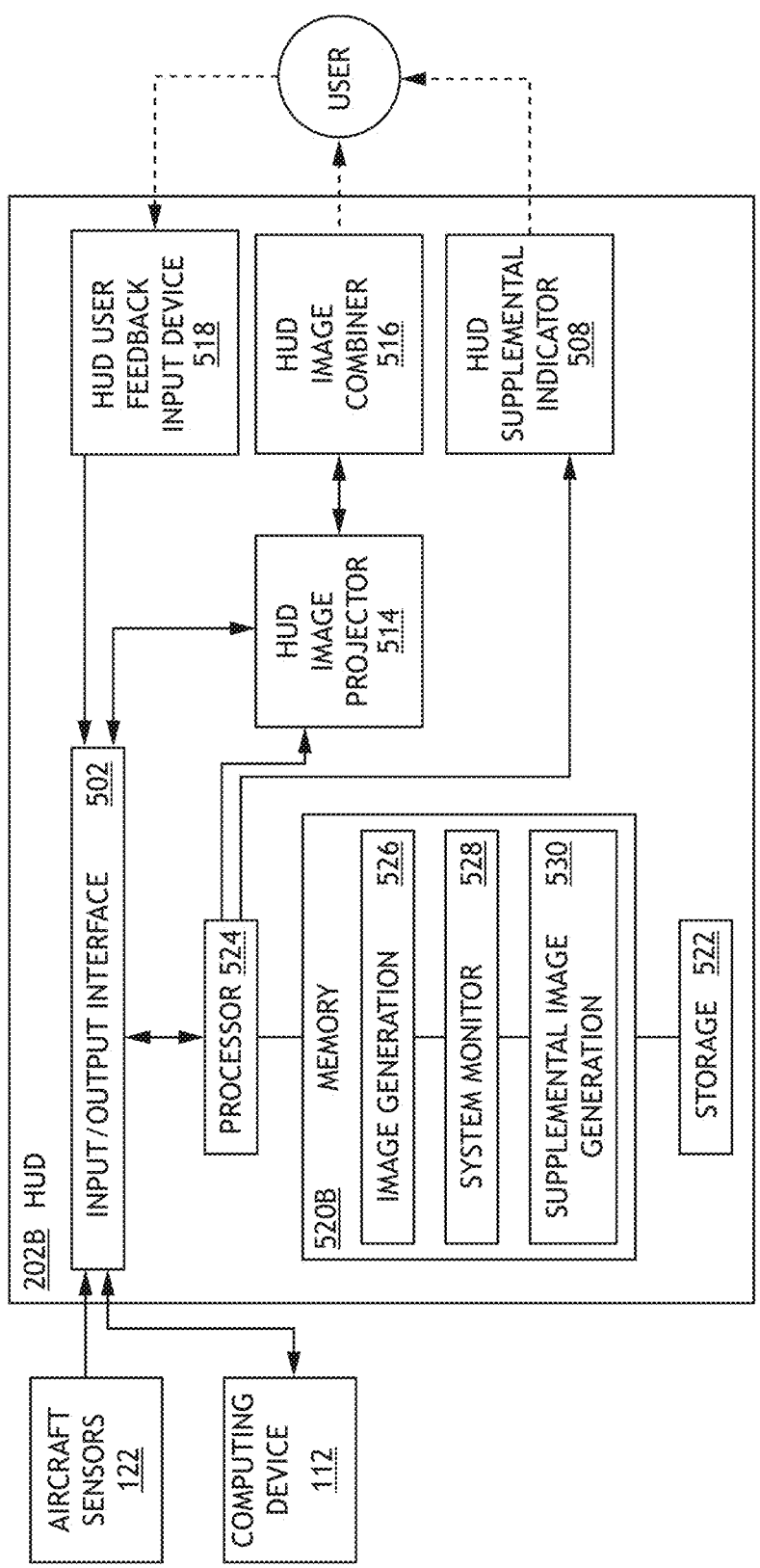
FIG. 5B is an exemplary diagram of a HUD of FIG. 2 according to the inventive concepts disclosed herein.

Referring now to FIG. 5B, an exemplary diagram of a HUD 202B, which may be one of the HUDs 202 of FIG. 2, according to the inventive concepts disclosed herein is depicted. The HUD 202B may include elements similar to and function similar to HUD 202A of FIG. 5A except that the processor 524 of HUD 202B may be configured to (e.g., programmed to) to perform the functionality of the system monitor processor 504, the supplemental image generation processor 506, the data processor 510, and the image generation processor of the HUD 202A of FIG. 5A. For example, the processor 510 may be configured to perform the functionality of system monitor processor 504, the supplemental image generation processor 506, the data processor 510, and the image generation processor of the HUD 202A of FIG. 5A by executing instructions of software modules (e.g., image generation software module 526, system monitor software module 528, and supplemental image generation module 530) maintained (e.g., stored) in at least one non-transitory computer-readable medium (e.g., memory 520B and/or storage 522). For example, execution of the system monitor software module 528 by the processor 524 may cause the processor 524 to function similarly to the system monitor processor 504 of FIG. 5A; execution of the image generation software module 526 by the processor 524 may cause the processor 524 to function similarly to the image generation processor 512 of FIG. 5A; and execution of the supplemental image generation module 530 may cause the processor 524 to function similarly to the supplemental image generation processor 506 of FIG. 5A. The processor 524 may be implemented as a special purpose processor configured to execute instructions for performing any or all of the operations disclosed throughout.

Referring now to FIGS. 6-9, views of exemplary HUDs 202-1A, 202-1B, 202-2A, and 202-2B according to the inventive concepts disclosed herein are depicted. The HUDs 202-1A, 202-1B, 202-2A, and 202-2B include elements similar to and function similar to HUDs 202A, 202B, 202-1, and/or 202-2.

Referring now to FIG. 6, a view of exemplary HUD 202-1A according to the inventive concepts disclosed herein is depicted. For example, the HUD 202-1A may be implemented as a compact HUD including a top plate 604. The top plate may be positioned between an attachment point (e.g., a ceiling of a cockpit of the aircraft 102) of the HUD 202-1A and the HUD image combiner 516 such that the top plate 604 supports the HUD image combiner 516. The HUD 202-1A may include a touchscreen display HUD supplemental indicator 602. The touchscreen display HUD supplemental indicator 602 may include or be implemented as elements similar to and function similar to a particular HUD supplemental indicator 508 (e.g., implemented as a display indicator) integrated with a particular HUD user feedback input device 518), as described with respect to FIGS. 5A-B. That is, for example, touchscreen display HUD supplemental indicator 602 may include a touchscreen display that functions as a particular HUD supplemental indicator 508 integrated with a particular HUD user feedback input device 518, as described with respect to FIGS. 5A-B. For example, the touchscreen display HUD supplemental indicator 602 may be implemented on the top plate 604 of the HUD 202-1A.

In an exemplary embodiment, the touchscreen display HUD supplemental indicator 602 may be configured to display three rows of 21 characters; however, some embodiments may be configured to display any suitable number (e.g., at least one) of row(s) and suitable number (e.g., at least one) of characters per particular row. The touchscreen display HUD supplemental indicator 602 may be implemented with any suitable size and/or dimensions; for example, in an exemplary embodiment, the touchscreen display HUD supplemental indicator 602 may be less than six inches (e.g., approximately three inches (e.g., +/−1 inch)) wide by less than two inches (e.g., approximately one-third of an inch (e.g., +/−0.2 inches)) tall. In some embodiments, the touchscreen display HUD supplemental indicator 602 may be configured to display textual portions as any suitable color or combination of colors. For example, "ENG ICE FAIL" may be a system level warning that that may be displayed as red text, "123 . . . 901" may be displayed as yellow text, and "This is the third" may be an advisory message that may be displayed as white text. Additionally, for example, caution messages may be displayed as yellow text. In some embodiments, the pilot may acknowledge and/or dismiss a warning alert, caution alert, or advisory alert by touching the touchscreen display HUD supplemental indicator 602. However, in some embodiments, the touchscreen display HUD supplemental indicator 602 may be located elsewhere on the HUD 202-1A. Further, embodiments may include any suitable number (e.g., at least one) of touchscreen display HUD supplemental indicators.

Referring now to FIG. 7, a view of exemplary HUD 202-1B according to the inventive concepts disclosed herein is depicted. The HUD 202-1B may include elements similar to and function similar to the HUD 202-1A except that the HUD 202-1B may include touch-sensitive illuminator HUD supplemental indicators 702, 704 rather than the touchscreen display HUD supplemental indicator 602. The touch-sensitive illuminator HUD supplemental indicators 702, 704 may include or be implemented as elements similar to and function similar to particular HUD supplemental indicators 508 (e.g., implemented as illuminator indicators (e.g., LED indicators)) integrated with a particular HUD user feedback input device 518 (e.g., a touch sensitive HUD user feedback input device (e.g., physical button or a touch-sensitive sensor), as described with respect to FIGS. 5A-B. That is, for example, the touch-sensitive illuminator HUD supplemental indicators 702, 704 may include illuminator indicators that functions as particular HUD supplemental indicators 508 integrated with touch sensitive HUD user feedback input devices that function as HUD user feedback input devices 518, as described with respect to FIGS. 5A-B. For example, the touch-sensitive illuminator HUD supplemental indicators 702, 704 may be implemented on the top plate 604 of the HUD 202-1A; however, in some embodiments, the touch-sensitive illuminator HUD supplemental indicators 702, 704 may be located elsewhere on the HUD 202-1B. The touch-sensitive illuminator HUD supplemental indicators 702, 704 may have any suitable shape, size, and/or dimensions. Further, embodiments may include any suitable number (e.g., at least one) of touch-sensitive illuminator HUD supplemental indicators.

In an exemplary embodiment, each of the touch-sensitive illuminator HUD supplemental indicators 702, 704 may be configured to light up to notify a pilot of any of various alerts (e.g., warning alerts, caution alerts, and/or advisory alerts).

For example, if an aircraft system (e.g., the FMS computing device 112-1 and/or the EICAS computing device) determines an occurrence of warning condition (e.g., loss of engine power), the aircraft system may send a warning alert message to the HUD 202-1B, and in response to receiving the warning alert message, a processor of the HUD 202-1B may cause the touch-sensitive illuminator HUD supplemental indicator 704 to illuminate (e.g., illuminate with any suitable color, such as red) so as to notify the pilot of the warning alert. Once the pilot notices that the touch-sensitive illuminator HUD supplemental indicator 704 is illuminated, the pilot may view the HDD 226 to determine the nature of the warning alert so that the pilot may take appropriate action. Upon taking appropriate action and/or upon noticing the illumination, the pilot may touch the touch-sensitive illuminator HUD supplemental indicator 704 to dismiss the warning alert or to acknowledge the warning alert.

Similarly, for example, if an aircraft system (e.g., the FMS computing device 112-1) determines an occurrence of caution condition (e.g., a determination of upcoming air turbulence), the aircraft system may send a caution alert message to the HUD 202-1B, and in response to receiving the caution alert message, a processor of the HUD 202-1B may cause the touch-sensitive illuminator HUD supplemental indicator 702 to illuminate (e.g., illuminate with any suitable color, such as amber) so as to notify the pilot of the caution alert. Once the pilot notices that the touch-sensitive illuminator HUD supplemental indicator 702 is illuminated, the pilot may view the HDD 226 to determine the nature of the caution alert so that the pilot may take appropriate action. Upon taking appropriate action and/or upon noticing the illumination, the pilot may touch the touch-sensitive illuminator HUD supplemental indicator 702 to dismiss the caution alert or to acknowledge the caution alert.

Referring now to FIG. 8, a view of exemplary HUD 202-2A according to the inventive concepts disclosed herein is depicted. For example, the HUD 202-2A may be implemented as a traditional HUD including an arm attachment assembly 812 positioned between an attachment point (e.g., a ceiling of a cockpit of the aircraft 102) of the HUD 202-2A and the HUD image combiner 516 such that the arm attachment assembly 812 supports the HUD image combiner 516. For example, the arm attachment assembly 812 may include a top support 810 and a side support 812. The top support 810 may be configured to support a portion of a top edge of the HUD image combiner 516, and side support 812 may be configured to support a portion of a side edge of the HUD image combiner 516. The HUD 202-2A may include illuminator HUD supplemental indicators 802, 804 and a touch-sensitive HUD user feedback input device 806.

The illuminator HUD supplemental indicators 802, 804 may be implemented similar to and function similar to the touch-sensitive illuminator HUD supplemental indicators 702, 704 of the HUD 202-1B of FIG. 7 except that the illuminator HUD supplemental indicators 802, 804 need not be touch sensitive and need not include integrated HUD user feedback input devices 518. For example, the illuminator HUD supplemental indicators 802, 804 may be located on a front portion (e.g., a displayed image side of the HUD 202-2A and/or a front surface portion generally parallel to a front surface of the HUD image combiner 516) of the side support 812 of the arm attachment assembly 812; however, in some embodiments, the illuminator HUD supplemental indicators 802, 804 may be located anywhere suitable on the HUD 802-2A. The illuminator HUD supplemental indicators 802, 804 may have any suitable shape, size, and/or dimensions. Further, embodiments may include any suitable number (e.g., at least one) of illuminator HUD supplemental indicators.

The touch-sensitive HUD user feedback input device 806 may include or may be implemented similar to and function similar to the HUD user feedback input devices 518 of FIGS. 5A-5B. For example, the touch-sensitive HUD user feedback input device 806 may be implemented as a physical button or a touch-sensitive sensor.

For example, the touch-sensitive HUD user feedback input device 806 may be located on a side portion (e.g., a side surface portion generally orthogonal to a front surface of the HUD image combiner 516) of the side support 812 of the arm attachment assembly 812; however, in some embodiments, the touch-sensitive HUD user feedback input device 806 may be located anywhere suitable on the HUD 802-2A. The touch-sensitive HUD user feedback input device 806 may have any suitable shape, size, and/or dimensions. Further, embodiments may include any suitable number (e.g., at least one) of touch-sensitive HUD user feedback input devices.

Referring now to FIG. 9, a view of exemplary HUD 202-2B according to the inventive concepts disclosed herein is depicted. The HUD 202-2B may include elements similar to and function similar to the HUD 202-2A of FIG. 8 except that illuminator HUD supplemental indicators 802, 804 and the touch-sensitive HUD user feedback input device 806 may be implemented at different locations from those depicted in FIG. 8.

While FIGS. 5A-9 exemplarily depict inventive concepts disclosed herein with respect to HUDs, in some embodiments, the inventive concepts disclosed herein may be applied to embodiments implemented as or including head worn displays (e.g., helmet-mounted display (HMD) 224). For example, the head worn display device may be implemented as or include a head-worn device (e.g., glasses, goggles, or a helmet). The head-worn device may include a HUD, which may be implemented similarly to and function similarly to the HUDs 202, 202-1, 202-2, 202-1A, 202-1B, 202-2A, and/or 202-2B except that the HUD may be implemented in, on, or as part of a the head-worn device. For example, the head-worn device may include an input/output interface 502 (which may be implemented similarly as and/or function similarly to the input/output interface 502), at least one processor (which may be implemented similarly as and/or function similarly to the system monitor processor 504, the supplemental image generation processor 506, the data processor 510, the image generation processor 512, and/or the processor 524), at least one (e.g., one or two) display device (which may be implemented similarly as and/or function similarly to the HUD image projector 514 and/or the HUD image combiner 516), at least one supplemental indicator (which may be implemented similarly as and/or function similarly to the at least one HUD supplemental indicator 508), at least one user feedback input device (which may be implemented similarly as and/or function similarly to the HUD user feedback input device 518), and at least one non-transitory computer readable medium (e.g., memory 520A, memory 520B, and/or storage 522), as well as any suitable components typically included in head-worn display devices.

Figure 10:
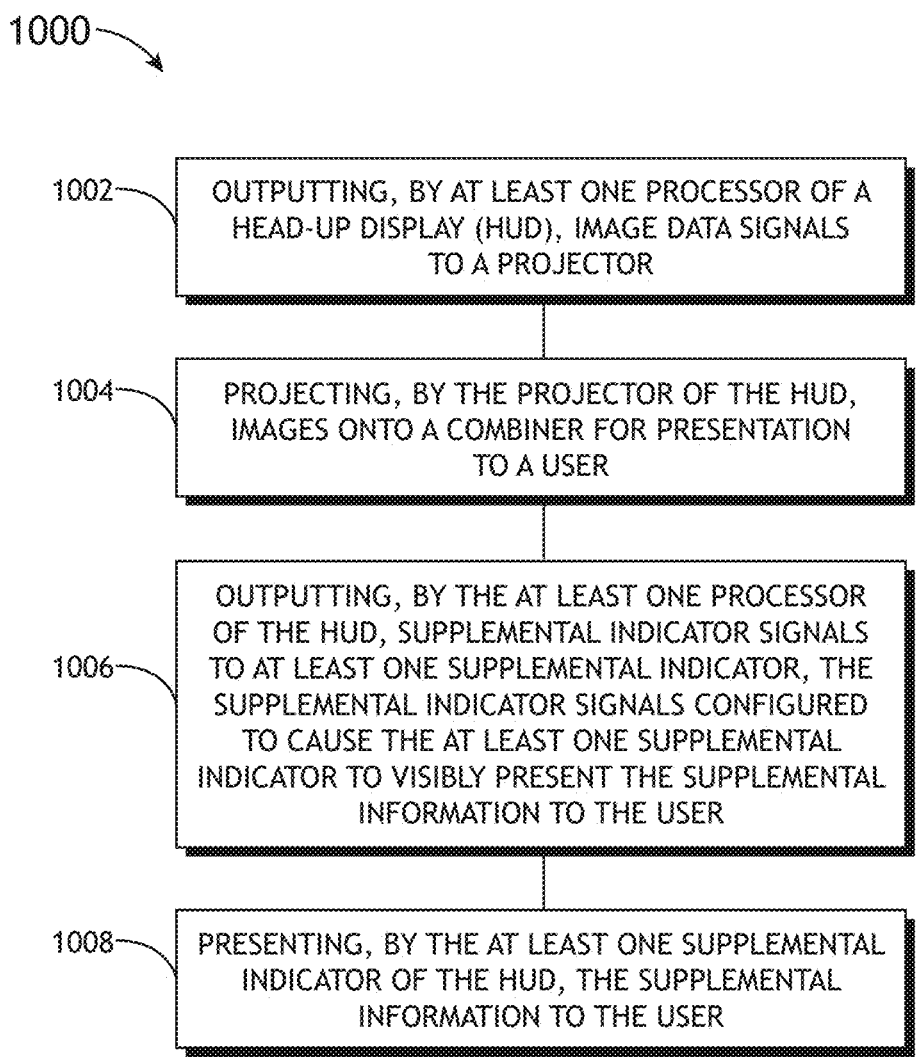
FIG. 10 is a diagram of an exemplary embodiment of a method for operating a HUD of FIG. 2 according to the inventive concepts disclosed herein.

Referring now to FIG. 10, an exemplary embodiment of a method 1000 for operating a HUD (e.g., 202, 202-1, 202-2, 202-1A, 202-1B, 202-2A, and/or 202-2B) according to the inventive concepts disclosed herein may include one or more of the following steps. Additionally, for example, some embodiments may include performing one more instances of the method 1000 iteratively, concurrently, sequentially and/or non-sequentially.

A step 1002 may include outputting, by at least one processor of a HUD, image data signals to a projector.

A step 1004 may include projecting, by the projector of the HUD, images onto a combiner for presentation to a user.

A step 1006 may include outputting, by the at least one processor of the HUD, supplemental indicator signals to at least one supplemental indicator, the supplemental indicator signals configured to cause the at least one supplemental indicator to visibly present the supplemental information to the user.

A step 1008 may include presenting, by the at least one supplemental indicator of the HUD, the supplemental information to the user.

Further, the method 1000 may include any of the operations disclosed throughout.

As will be appreciated from the above, embodiments of the inventive concepts disclosed herein may be directed to a HUD, a system including a HUD, and a method for operating a HUD. Some embodiments may include a HUD including a supplemental indicator and a user feedback input device.

As used throughout and as would be appreciated by those skilled in the art, "at least one non-transitory computer-readable medium" may refer to as at least one non-transitory computer-readable medium (e.g., memory 110, memory 116, memory 212, memory 116-1, memory 116-2, memory 520A, memory, 520B, storage 118, storage 214, storage 118-1, storage 118-2, storage 522, or a combination thereof; e.g., at least one computer-readable medium implemented as hardware; e.g., at least one non-transitory processor-readable medium, at least one memory (e.g., at least one non-volatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A head-up display (HUD), comprising:
   a combiner configured to present images to a user, wherein the combiner is an overhead refractive combiner or a waveguide combiner;
   a projector configured to project images onto or through the combiner;
   a top plate or an arm, attachment assembly, wherein the top plate or the arm attachment assembly is connected to the combiner and to a ceiling of a cockpit of an aircraft;
   at least one HUD supplemental indicator configured to visibly present supplemental information to the user, the at least one HUD supplemental indicator implemented at least in part as at least one display and located on the top plate or the arm attachment assembly of the HUD at a location apart from the combiner, wherein the at least one display comprises a touchscreen display;
   at least one processor communicatively coupled to the at least one HUD supplemental indicator and the projector, the at least one processor configured to:
   output image data signals to the projector, the image data signals configured to cause the projector to project the images onto or through the combiner;
   receive at least one alert text message from at least one of an engine indication and crew alerting system (EICAS) computing device, a crew alerting system (CAS) computing device, or a processing and video generation system computing device, wherein the at least one alert text message includes a warning alert text message, a caution alert text message, and an advisory alert text message; and
   output supplemental indicator signals to the at least one HUD supplemental indicator, the supplemental indicator signals configured to cause the at least one HUD supplemental indicator to visibly present the supplemental information to the user, wherein the supplemental information includes first supplemental information associated with the warning alert text message, second supplemental information associated with the caution alert text message, and third supplemental information associated with the advisory alert text message, wherein the first supplemental information is presented as a first color, wherein the second supplemental information is presented as a second color, wherein the third supplemental information is presented as a third color, wherein each of the first, second, and third color is different; and
   a user feedback input device configured to receive user inputs associated with the supplemental information from the user and output user feedback data associated with the user inputs to the at least one processor, wherein the user feedback input device comprises a microphone and an eye tracking system,
   wherein the at least one HUD supplemental indicator comprises at least one illuminator HUD supplemental indicator, wherein the at least one illuminator HUD supplemental indicator comprises at least one touch-sensitive illuminator HUD supplemental indicator, wherein the supplemental information visibly presented by the at least one HUD supplemental indicator is configured to visibly alert the user when the user views the combiner.

2. The HUD of claim 1, wherein the at least one HUD supplemental indicator is located proximate to a display area of the combiner such that the at least one HUD supplemental indicator and a display area of the combiner are in a field of view of the user, wherein the caution alert text message is associated with air turbulence.

3. The HUD of claim 1, wherein the at least one processor is further configured to:
   receive the user feedback data from the user feedback input device; and process the user feedback data.

4. The HUD of claim 3, wherein the at least one processor is further configured to:
   determine that the user has dismissed the supplemental information presented by the at least one HUD supplemental indicator; and
   output at least one additional signal to the at least one HUD supplemental indicator, the at least one additional signal configured to cause the at least one HUD supplemental indicator to cease visibly presenting the supplemental information to the user.

5. The HUD of claim 3, wherein the at least one processor is further configured to:
   output data associated with the user feedback data to a device external to the HUD.

6. The HUD of claim 1, wherein one of the at least one HUD supplemental indicator comprises the user feedback input device.

7. The HUD of claim 1, wherein the user feedback input device is touch sensitive.

8. The HUD of claim 1, wherein the at least one HUD supplemental indicator comprises at least one display HUD supplemental indicator, wherein the at least one display HUD supplemental indicator comprises the at least one display.

9. The HUD of claim 1, wherein the at least one touch-sensitive illuminator HUD supplemental indicator comprises at least one touch sensor.

10. The HUD of claim 1, wherein the at least one illuminator HUD supplemental indicator comprises the at least one light emitting diode (LED).

11. The HUD of claim 1, wherein the HUD is an aircraft HUD, and wherein the user is a pilot.

12. The HUD of claim 1, wherein the at least one processor is further configured to:
    receive the warning alert text message and the caution alert text message from the EICAS computing device, wherein the warning alert text message is associated with a loss of engine power; and
    output supplemental indicator signals to the at least one HUD supplemental indicator, the supplemental indicator signals configured to cause the at least one HUD supplemental indicator to visibly present the supplemental information to the user.

13. The HUD of claim 12, wherein the combiner is the overhead refractive combiner.

14. A system, comprising:
    at least one non-transitory computer-readable medium;
    at least one processor communicatively coupled to the at least one non-transitory computer-readable medium; and
    a head up-display (HUD) communicatively coupled with the at least one processor, the HUD comprising:
    a combiner configured to present images to a user, wherein the combiner is an overhead refractive combiner or a waveguide combiner;
    a top plate or an arm attachment assembly, wherein the top plate or the arm attachment assembly is connected to the combiner and to a ceiling of a cockpit of an aircraft;
    a projector configured to project images onto or through the combiner;

at least one HUD supplemental indicator configured to visibly present supplemental information to the user, the at least one HUD supplemental indicator implemented at least in part as at least one display and located on the top plate or the arm attachment assembly of the HUD at a location apart from the combiner, wherein the at least one display comprises a touchscreen display;

at least one HUD processor communicatively coupled to the at least one HUD supplemental indicator and the projector, the at least one HUD processor configured to:

output image data signals to the projector, the image data signals configured to cause the projector to project the images onto or through the combiner;

receive at least one alert text message from at least one of an engine indication and crew alerting system (EICAS) computing device, a crew alerting system (GAS) computing device, or a processing and video generation system computing device, wherein the at least one alert text message includes a warning alert text message, a caution alert text message, and an advisory alert text message; and output supplemental indicator signals to the at least one HUD supplemental indicator, the supplemental indicator signals configured to cause the at least one HUD supplemental indicator to visibly present the supplemental information to the user, wherein the supplemental information includes first supplemental information associated with the warning alert text message, second supplemental information associated with the caution alert text message, and third supplemental information associated with the advisory alert text message, wherein the first supplemental information is presented as a first color, wherein the second supplemental information is presented as a second color, wherein the third supplemental information is presented as a third color, wherein each of the first, second, and third color is different; and a user feedback input device configured to receive user inputs associated with the supplemental information from the user and output user feedback data associated with the user inputs to the at least one processor, wherein the user feedback input device comprises a microphone and an eye tracking system, wherein the at least one HUD supplemental indicator comprises at least one illuminator HUD supplemental indicator, wherein the at least one illuminator HUD supplemental indicator comprises at least one touch-sensitive illuminator HUD supplemental indicator, wherein the supplemental information visibly presented by the at least one HUD supplemental indicator is configured to visibly alert the user when the user views the combiner.

15. A method for operating a head-up display (HUD), comprising:

outputting, by at least one processor of a head-up display (HUD), image data signals to a projector;

projecting, by the projector of the HUD, images onto or through a combiner for presentation to a user, wherein a top plate or an arm attachment assembly is connected to the combiner and to a ceiling of a cockpit of an aircraft, wherein the combiner is an overhead refractive combiner or a waveguide combiner;

receiving, by the at least one processor of the HUD, at least one alert text message from at least one of an engine indication and crew alerting system (EICAS) computing device, a crew alerting system (GAS) computing device, or a processing and video generation system computing device, wherein the at least one alert text message includes a warning alert text message, a caution alert text message, and an advisory alert text message;

outputting, by the at least one processor of the HUD, supplemental indicator signals to at least one HUD supplemental indicator, the supplemental indicator signals configured to cause the at least one HUD supplemental indicator to visibly present the supplemental information to the user, wherein the supplemental information includes first supplemental information associated with the warning alert text message, second supplemental information associated with the caution alert text message, and third supplemental information associated with the advisory alert text message, wherein the first supplemental information is presented as a first color, wherein the second supplemental information is presented as a second color, wherein the third supplemental information is presented as a third color, wherein each of the first, second, and third color is different, the at least one HUD supplemental indicator implemented at least in part as at least one display and located on the top plate or the arm attachment assembly of the HUD at a location apart from the combiner, wherein the at least one display comprises a touchscreen display;

presenting, by the at least one HUD supplemental indicator of the HUD, the supplemental information to the user;

receiving, by a user feedback input device of the HUD, user inputs associated with the supplemental information from the user; and outputting, by the user feedback input device of the HUD, user feedback data associated with the user inputs to the at least one processor, wherein the user feedback input device comprises a microphone and an eye tracking system, wherein the at least one HUD supplemental indicator comprises at least one illuminator HUD supplemental indicator, wherein the at least one illuminator HUD supplemental indicator comprises at least one touch-sensitive illuminator HUD supplemental indicator, wherein the supplemental information visibly presented by the at least one HUD supplemental indicator is configured to visibly alert the user when the user views the combiner.

\* \* \* \* \*